US011095558B2

(12) United States Patent
Cheng et al.

(10) Patent No.: US 11,095,558 B2
(45) Date of Patent: Aug. 17, 2021

(54) ASIC FOR ROUTING A PACKET

(71) Applicant: Alibaba Group Holding Limited, Grand Cayman (KY)

(72) Inventors: Gang Cheng, Bellevue, WA (US); Li Han, Bellevue, WA (US); Wei Zhao, Bellevue, WA (US)

(73) Assignee: Alibaba Group Holding Limited, George Town (KY)

( * ) Notice: Subject to any disclaimer, the term of this patent is extended or adjusted under 35 U.S.C. 154(b) by 76 days.

(21) Appl. No.: 16/236,263

(22) Filed: Dec. 28, 2018

(65) Prior Publication Data

US 2020/0213224 A1 Jul. 2, 2020

(51) Int. Cl.
| *H04L 12/715* | (2013.01) |
| *H04L 12/931* | (2013.01) |
| *H04L 12/46* | (2006.01) |
| *H04L 12/747* | (2013.01) |
| *H04L 12/713* | (2013.01) |
| *H04L 12/717* | (2013.01) |
| *H04L 12/743* | (2013.01) |

(52) U.S. Cl.
CPC .......... *H04L 45/64* (2013.01); *H04L 12/4645* (2013.01); *H04L 45/04* (2013.01); *H04L 45/42* (2013.01); *H04L 45/586* (2013.01); *H04L 45/742* (2013.01); *H04L 49/70* (2013.01); *H04L 45/7453* (2013.01)

(58) Field of Classification Search
CPC ..... H04L 45/64; H04L 49/70; H04L 12/4645; H04L 45/742; H04L 45/586; H04L 45/7453; H04L 45/42; H04L 45/04
See application file for complete search history.

(56) References Cited

U.S. PATENT DOCUMENTS

| 8,560,663 | B2 | 10/2013 | Baucke et al. | |
| 8,811,409 | B2 | 8/2014 | Allan | |
| 8,831,000 | B2 | 9/2014 | Mishra et al. | |
| 9,306,837 | B1* | 4/2016 | Jain | H04L 45/16 |
| 10,193,749 | B2 | 1/2019 | Hira et al. | |
| 10,367,757 | B2 | 7/2019 | Chandrashekhar et al. | |
| 2013/0103834 | A1 | 4/2013 | Dzerve et al. | |
| 2014/0241247 | A1* | 8/2014 | Kempf | H04L 12/4641 370/328 |
| 2015/0124586 | A1* | 5/2015 | Pani | H04L 61/2007 370/219 |
| 2015/0326467 | A1* | 11/2015 | Fullbright | H04L 45/64 709/242 |
| 2016/0182342 | A1* | 6/2016 | Singaravelu | G06F 9/45558 370/253 |
| 2017/0187622 | A1* | 6/2017 | Pu | H04L 12/465 |
| 2018/0109602 | A1 | 4/2018 | Doctor et al. | |
| 2019/0103992 | A1 | 4/2019 | Cidon et al. | |
| 2019/0109729 | A1* | 4/2019 | De Luca | H04L 41/0896 |
| 2019/0268421 | A1 | 8/2019 | Markuze et al. | |

(Continued)

FOREIGN PATENT DOCUMENTS

| WO | WO2014083449 A1 | 6/2014 |
| WO | WO2018010626 A1 | 1/2018 |

*Primary Examiner* — Omar J Ghowrwal

(74) *Attorney, Agent, or Firm* — Lee & Hayes, P.C.

(57) ABSTRACT

The techniques described herein include isolating network traffic between tenants using a programmable switch that routes network traffic directly to the appropriate virtual private cloud (VPC) and/or virtual machine (VM).

11 Claims, 8 Drawing Sheets

(56) References Cited

U.S. PATENT DOCUMENTS

2020/0067734 A1\* 2/2020 Hira ................. H04L 45/64
2020/0213279 A1\* 7/2020 Xiong ............... H04L 61/6022
2020/0328914 A1\* 10/2020 Liu .................. H04L 12/4633

\* cited by examiner

ASIC FOR ROUTING A PACKET

BACKGROUND

One of the major services provided by a cloud service provider is to offer to its users the provider's infrastructure (e.g., cores of processors, storage space) for running virtual machines (VMs). Users may remotely access instances of VMs running on the infrastructure via a virtual private cloud (VPC). Network traffic generated from customer-premises equipment (CPE) that is seeking to access a specific VM instance running in a VPC may be received at a network controller (NC), which forwards the network traffic to a switch that forwards the traffic to the appropriate gateway via a route announced according to an exterior gateway protocol (e.g., exterior gateway protocol (EGP), border gateway protocol (BGP)). The gateway, in turn, forwards the traffic to the appropriate physical machine running the VM via MAC address. In other words, the gateway handles all the packets in and out of the overlay network.

However, users have increasingly demanded greater capacity and performance for remote VPC access. For example, recent bandwidth requirements have quadrupled and then more than doubled. Moreover, users need increased port density. Handling all the packets in and out of the overlay network at the gateway does not provide the port density and/or bandwidth to VPCs (which require some form of traffic sectioning) without experiencing increased latency and decreased per connection consistency (PCC) during frequent VM changes. Demand for more routes has also increased—in some cases users require 20,000 routes per VPC. For a customer switch that hosts about 1,000 users, that means the customer switch may need to support up to 20 million routes. No such device exists today.

Moreover, multiple tenants may share a provider's same physical infrastructure. Cloud service providers may implement network function virtualization (NFV) to allow tenants to form an overlay network in a multi-tenant network. Typically, NFV is deployed on an x86 system and forms the overlay network layer. Using an x86 system adds flexibility to the network architecture and allows new features to be rolled out to the infrastructure quickly. However, x86 systems incur high management costs, high power consumption, limited performance, and poor scalability.

To isolate tenants' traffic, the provider may deploy virtual routing and forwarding (VRF) for each VM host. Deploying VRF includes generating routing tables for each VM host so that a router that receives packets destined for a particular VM host can use the routing table associated with that VM host to route the packets. However, this proliferates the number of routing tables taking up space and open connections in the underlay network. Overlay solutions for handling all this traffic are prohibitively expensive at this time (e.g., routers that can handle thousands and/or millions of connections can each cost $1 million or more each). Furthermore, the routers that handle these connections typically have statically allocated resources, such as memory space, which also causes a bottleneck in scalability as the number of tenants grows.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
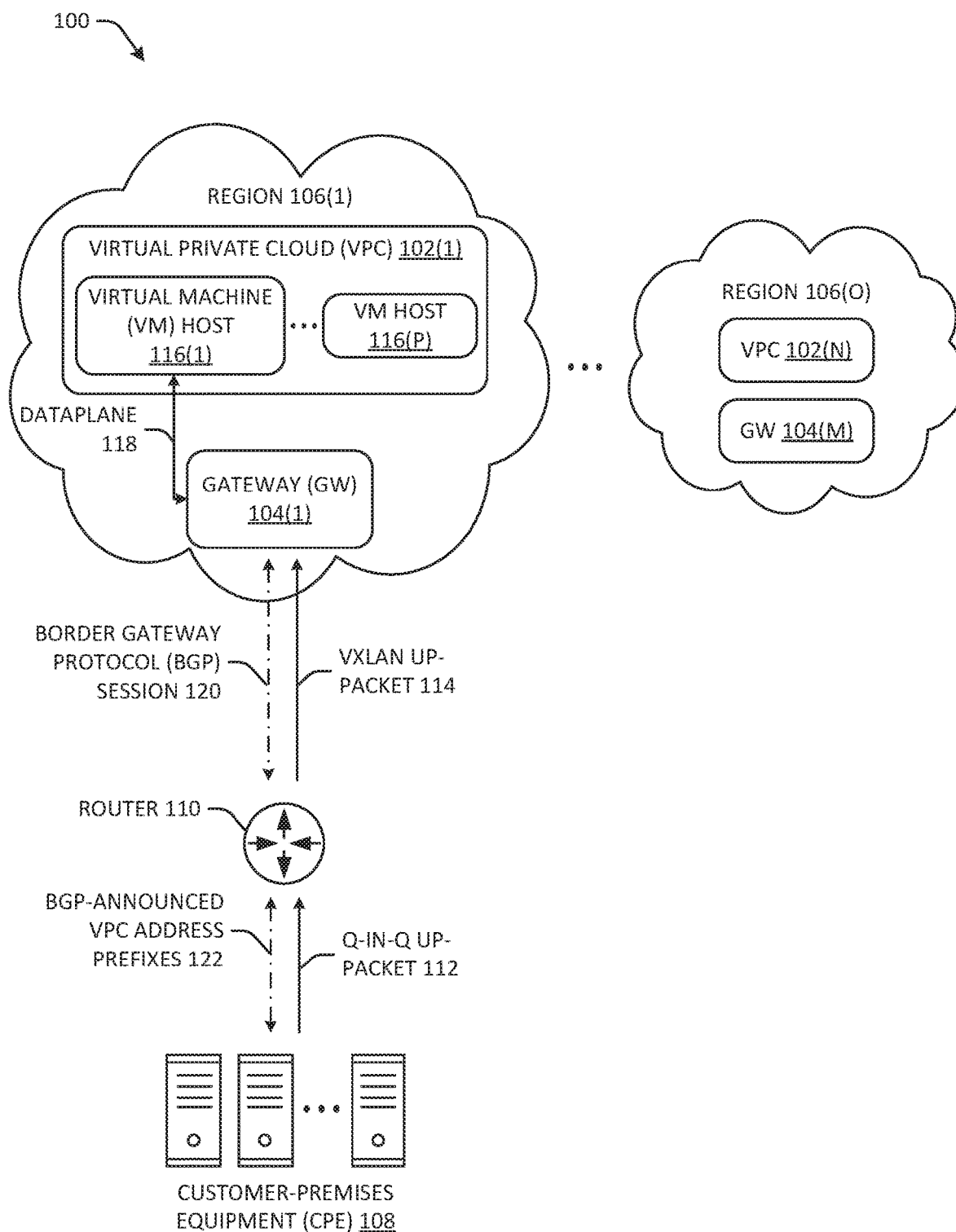
FIG. 1 illustrates a block diagram of an example architecture for handling network traffic in and out of an overlay network through a gateway.

This disclosure is generally directed to techniques (e.g., machines, processes) for handling network traffic between a point of delivery (PoD) (e.g., provider infrastructure that receives ingress packets from customer premises equipment (CPE) and/or that transmits egress packets to CPE) and a virtual machine (VM) instance running at a VM host. The VM instance may be running within a virtual private cloud (VPC). The techniques discussed herein may include a network architecture for handling this (and other) traffic that includes an offload controller (OC) and/or a programmable switch application-specific integrated circuit (ASIC), hereinafter referred to as a CSW. In some examples, these components may offload at least some of the packet forwarding and/or routing operations from a gateway.

In other techniques, the gateway handles all the packets in and out of the overlay network. For example, in other techniques, peering traffic received by a switch may be routed to a gateway (e.g., as the next hop) so that the gateway may conduct routing and MAC address lookup to correctly route packets between a VPC and CPE. In some examples, the gateway may run on an x86 machine. However, in some examples, the techniques discussed herein may include bypassing the gateway using an arrangement of hardware and operations that decreases network latency, supports full bisection traffic, decreases energy usage, decreases active management, and increases per connection consistency.

According to some of the techniques discussed herein, the OC may include a VPC controller and/or a virtual route controller (VRC). The VPC controller may (1) receive instructions from a client via a VPC console that may include software-defined network (SDN) instructions (e.g., virtual switch (Vswitch) subnet definitions, user-defined routes, user-defined Internet protocol (IP) address(es)); (2) receive and/or configure cross-region route(s) with other VPC controller(s) and/or gateways (e.g., in other regions and/or availability zones); (3) learn and/or publish border gateway protocol (BGP) routes in coordination with the VRC; and/or (4) configure routes to a VM host and/or VM instance in coordination with a VPC switch and/or the gateway.

In some examples, the VPC controller may configure BGP sessions to be announced from the VRC to the CPE directly and/or to the CPE via the CSW. In additional or alternate examples, the VPC controller may configure routes between a CSW and a VM host and/or VM instance that bypass the gateway. Upon finalizing a route, whether it be a BGP route or a route between a CSW and a VM host, the VPC controller may push a rule for the route to the VRC.

In some examples, operations of the VPC controller may be conducted by the VRC and vice versa. Additionally or alternatively, in some examples, the OC may be configured to automatically perform user-specified network connectivity policies to automate multi-zone multi-VPC virtual networks, automatically detect address conflicts and control user-dependent routing changes to ensure that network connectivity and user traffic are not affected or interrupted, even when the virtual network topology changes frequently (e.g., VM(s) migrated to new virtual switch and/or subnet); and/or provide users with the ability to customize network connectivity policies (e.g., via a client-facing VPC console that interfaces with the VPC controller).

The VRC may be configured to receive rules from the VPC controller. In some examples, the VRC and/or the VPC controller may configure a rule as an entry in a key-value table and may manage the entries in the table so that one entry exists per connection/route. The VRC may maintain a key-value table that sets rules for ingress packets (i.e., incoming packets received from CPE), an "ingress key-value table," and/or a key-value table that sets rules for egress packets (e.g., packets flowing to the user, packets flowing between regions, packets flowing between provider infrastructure), an "egress key-value table."

In some examples, the VRC may determine a subset of the table(s) stored at the VRC with which to program the CSW. For example, the VRC may determine a portion of an ingress key-value table and a portion of an egress key-value table with which to program the CSW. In some examples, programming the CSW with a portion of the table(s) may include hashing the portion of the table(s) to determine a hashed table that is pushed to the CSW. The table received by the CSW from the VRC may be 0073tored in a cache of the CSW as a "Connection Table." The VRC may additionally or alternatively determine when to add and/or delete entries from the Connection Table stored at the CSW. The VRC may push instructions to add entries to or delete entries from the Control to the CSW to remotely controlling behavior of the CSW and remotely program the CSW to bypass the gateway in certain instances, as discussed below. The VRC may additionally or alternatively resolve collisions at the CSW (e.g., false positives due to matching table keys and/or a hash collision, where two key/value pairs are actually unique but generate a same digest).

The CSW may receive rules from the VRC (e.g., in the form of a portion of the table(s) stored at the VRC and/or a hashed portion) and may store the received rules in a Connection Table in a cache of the CSW. In some examples, the Connection Table may include hashed ingress and/or egress key-value tables. In some examples, the CSW may include and/or replace underlay switches and may facilitate bypassing the gateway, based at least in part on being programmed by the OC.

To bypass the gateway, the techniques discussed herein may include offloading at least some of the packet processing from the gateway to the CSW and/or the OC. For example, the CSW's ASIC may receive an incoming packet and may route the incoming packet via a slow-path or a fast-path, based at least in part on the ASIC's programming, which may include the Connection Table. The fast-path may bypass the gateway and the slow-path may forward the packet to the gateway as the next hop. To determine which path to use for a packet, upon receiving a packet, the CSW may conduct a lookup in the Connection Table to determine whether packet data associated with the packet generates a hit with at least one of the entries in the Connection Table. If the packet generates a hit, the CSW may route the packet via the fast-path, which may include forwarding the packet directly to the VPC (e.g., by rewriting and/or encapsulating the packet), bypassing the gateway. In some examples, the VM host and/or a VPC switch may be the next hop from the CSW in the fast-path. In examples where the VPC switch receives the packet forwarded from the CSW, the VPC switch may decapsulate the packet and forward the decapsulated packet to the VM host and/or the VM instance.

On the other hand, when a packet does not generate a hit with the Connection Table (i.e., a "miss," where the lookup in the Connection Table does not return any results) the CSW may forward the packet via a slow-path. For example, a packet that generates a miss upon the CSW's search of the Connection Table may be a first packet to have been received in the cloud overlay networks where a session has not yet been created (e.g., a transmission control protocol (TCP) synchronize (SYN) message). The CSW may route this packet via the slow-path by forwarding the packet to the gateway. The gateway may then conduct various session establishment functions such as, for example, configuring a route (e.g., identifying a fastest path), MAC address lookup, etc., and may forward the packet to the appropriate VPC once these functions have been accomplished.

In some examples, after handling the packet and/or conducting the session establishment functions, the gateway may report session information such as a route configuration, MAC address, etc. to the OC (e.g., to the VPC controller and/or the VRC). The OC may use the session information to generate a key-value entry in the ingress table and/or egress table and may push an instruction to the CSW to insert an entry in the Connection Table on the CSW. In some examples, the VRC may additionally or alternatively determine an entry to delete from the Connection Table (e.g., to make room in the cache, since the CSW memory allocation may be limited, e.g., 3 MB or less). This inserted entry may cause the CSW to route subsequent packets received for that new session (e.g., packets from the same source and/or addressed for a same destination) via the fast-path.

In this manner, ingress packets that correspond to a same session may no longer reach the gateway, and the CSW may fully manage packet forwarding directly to the VPC instead. For example, for packets that can be forwarded based on an extant path (reflected by the rules stored in the Connection Table at the CSW and/or negotiated by the OC and/or gateway), the CSW may forward the packet to the appropriate physical machine(s) (e.g., using a MAC address, VxLAN network identifier (VNI), VM host IP address). In this manner, ingress packets may no longer reach the VPC gateway and the switch ASIC may fully manage packet forwarding directly to the VPC. This technique may decrease overall network latency while still supporting full bisection traffic and increasing per connection consistency. Moreover, this technique may eschew the need to deploy virtual routing and forwarding (VRF), as discussed in more detail below. Since VRF is a "heavy" protocol, eschewing its use may decrease memory use, compute time, and/or energy usage across the provider network.

In some examples, the CSW may generate a false positive hit. For example, if a TCP SYN packet generates a hit, this shouldn't be the case because a TCP SYN packet should trigger insertion of a new entry into the Connection Table. The CSW may forward the packet and/or a disambiguation request to the OC. The OC may resolve the false positive, which may be produced by a hash collision in some cases, by looking up the packet information in a full ingress/egress table and routing the packet. In some examples, the OC may include multiple pipelines and/or stages for rule handling, which may include generating a key-value entry in an ingress/egress table for a session and/or hashing the entry. In some examples, two distinct stages of the OC may use different hash functions and/or hash salts. Therefore, the OC may migrate the collided entry to a different pipeline/stage so that a new hash may be generated for the collided entry. The collided entry may be replaced with the newly hashed entry (that is hashed using a different salt and/or hash function) and the VRC may push this newly hashed entry to the CSW.

In other techniques, the provider network may isolate network traffic using VRF (e.g., via the Connection Table scheme discussed herein). For example, a router configured on an x86 machine or on component(s) of a network function virtualization (NFV) architecture may route traffic using a VRF scheme that employs a different routing table for each different client and/or VM host. According to this scheme, a router may route packets received from a certain client using a routing table that corresponds to that client or VM host. However, as the number of clients increases, provider resource allocation becomes less flexible and statically allocated resources, such as memory space, may become a bottle neck as routing tables proliferate. Moreover, with underlay connections proliferating, routers that are capable of handling thousands or millions of routes are extremely expensive at this time.

However, according to the techniques discussed herein, the CSW may be additionally or alternatively configured to isolate client traffic without using VRF. For example, the CSW may route packets directly to the VPC switch and/or VM host (isolating client traffic from other clients) based at least in part on data associated with an ingress packet such as, for example, a virtual LAN (VLAN) tag, destination Internet protocol (IP) address, etc. In some examples, the CSW may do this without using VRF (and without a router being configured to conduct VRF). For example, the CSW may use a switch interface that receives a packet, the packet's VLAN tag, and/or destination IP address (e.g., the VM IP address) to determine the VxLAN network identifier (VNI) that corresponds with the appropriate VPC switch and/or VM host to route ingress traffic via a fast-path. In this example, the CSW may encapsulate a VM host IP (e.g., a virtual tunnel end point (VTEP) address which may be the provider's address for the destination VM and/or may be referenced by the client's destination IP address in the packet) according to the VPC VNI and transmit it to the VPC switch. For ingress traffic routed via a slow-path, the CSW may use the switch interface that received a packet, the VLAN tag associated with the packet, and/or the classless inter-domain routing (CIDR) block for which the packet it destined (e.g., the destination subnet) to determine a global VNI in which to encapsulate the packet and/or a gateway IP to which to forward the encapsulated packet. Routing ingress packets, via the slow or fast-path, may include decapsulating the packet from VLAN and encapsulating the packet in VxLAN.

For egress traffic, the CSW may use the VNI associated with a packet received at the CSW to determine the interface, VLAN tag, and/or next hop that should be associated with the egress packet. Routing the egress traffic may include decapsulating the egress packets from VxLAN and encapsulating the egress packets in VLAN. Thus, between the ingress and egress traffic handling processes described herein, the provider may choose not to deploy VRF while still maintaining tenant isolation.

In examples where the CSW and/or a router conducts VRF, the VRC may announce BGP routes and/or next-hops into the VRFs maintained by the CSW. This may allow the VRC to announce BGP routes to CPE. For example, according to a first technique, a gateway (e.g., a VPC gateway) may run a BGP session with a switch to announce VPC address prefixes to the switch, which then forwards the VPC address prefixes to the user's network via CPE, and the gateway may also receive CPE prefixes from CPE via the switch. The gateway may then configure path rules for the CPE prefixes and/or the VPC address prefixes. Level 3 traffic received by a switch from an on-premise host destined to VPCs may be tunneled in a virtual extensible local area network (LAN) (VxLAN) tunnel. Since the tunnel is stateless, traffic from VPC VMs on a return path to on-premise equipment may follow an optimized path orchestrated by a virtual networking data plane, being forwarded directly to the CSW, bypassing the VPC gateway. However, this can't provide BGP routing to meet some users' requirements, since both the control and data plane converge at the CSW in this first technique.

However, according to at least one technique discussed herein, the VRC may conduct BGP routing, thereby offloading BGP routing from the CSW and/or the gateway to the VRC. The VRC may also reduce the number of hops and latency of each remaining hop in the data plane, eliminate a load balancer that, in some architectures, sits in front of the VPCs, and improve the resiliency of the architecture so that flows from CSW can failover rapidly between VPC gateways by controlling BGP peering. In some examples, the VRC may announce BGP routes directly to CPE and or the VRC may announce BGP routes via the CSW.

Ingress packets may be alternatively, and equivalently, referred to as "up" packets and the flow direction of ingress packets towards the core of the provider infrastructure (e.g., to a VM host) as "upstream" and egress packets may be alternatively, and equivalently, referred to as "down" packets and the flow direction of egress packets towards the Internet, other regions, and/or CPE as "downstream."

Example Architecture

FIG. 1 illustrates a block diagram of a first example network architecture 100 according to a first technique for handling network traffic in and out of an overlay network, such as VPC 102(1), through a gateway 104. FIG. 1 depicts a first gateway, 104(1), up to an m-th gateway, 104(M). In some examples, there may be multiple gateways per VPC and/or multiple VPCs per gateway. According to the first technique, gateway 104 may provide a target in VPC route tables for Internet-routable traffic and may perform network address translation (NAT) for VM instances that have been assigned public IPv4 addresses. In some examples, the gateway 104 may be a virtual private gateway (VGW) for dynamically routing a virtual private network (VPN) connection to other gateways and/or VPCs (potentially in different availability zones and/or regions) and/or the VGW may relay traffic in and out of a VPC. The gateway 104 may also peer other gateways via a BGP session (e.g., gateways in a different region, such as region 106(0).

According to the first technique, network traffic received from CPE 108 may be received at a PoD and forwarded to a router 110. The topology of the PoD is not illustrated in any of the figures herein because a variety of topologies exist (e.g., leaf-spine, core/aggregation/access) and each of these may ultimately relay packets between CPE and router 108 (and/or the CSW illustrated in the other figures). The router 110 (and/or the CSW illustrated in the other figures) may itself be a portion of the PoD topology (e.g., it may be a border spine switch). Although, in other examples, the router 110 is the next hop for a border spine switch. Regardless, because of the potential variations in PoD topologies, the PoD topology is not depicted.

In some examples, a packet (112) received at the router 110 may be tunneled in a VPN (e.g., 802.1Q tunneling (Q-in-Q)) and may include one or more VLAN tags in the frame. The router 110 may receive the packet 112 and may decapsulate the Q-in-Q ingress packet 112 and encapsulate (114) the decapsulated packet as a VxLAN up-packet 114. The router 108 may then forward the VxLAN up-packet 114 according to a VRF routing table to the appropriate gateway 104(1). In some examples, in order to encapsulate and forward the VxLAN up-packet 114 in a manner that enforces routing isolation among tenants, according to the first technique, a separate VNI may be mapped to each VRF instance and each tenant may have its own VRF routing instance. Each VRF instance may be associated with a routing table and VRF may require a forwarding table that designates the next hop for each data packet, a list of devices that may be called upon to forward the packet, and a set of rules and routing protocols that govern how the packet is forwarded. These tables prevent traffic from being forwarded outside a specific VRF path and also keep out traffic that should remain outside the VRF path. As clients/connections proliferate, this may cause a bottleneck at memory-limited devices and may incur high energy consumption and compute cycles.

According to the first technique, the gateway 104(1) may be the next hop for peering traffic received by the customer switch from CPE 106 destined to the VPC 102(1) and/or VM host 118(1). The gateway 104 may receive the VxLAN up-packet 114, decapsulate it, and forward the decapsulated packet to the correct VM host 116 after performing routing and/or MAC lookup via dataplane 118. A VM host 116 may include a physical machine that runs a hypervisor that may create, run, and/or manage one or more VM instances. For example, the VM host may include one or more cores of a processor and/or associated memory and a VM instance may run on one or more cores of the processor, depending on the service-level agreement (SLA) between the tenant and the provider.

In some examples, the gateway 104 may run a BGP session 120 with the router 110 and announce the VPC address prefixes to the router 110, which may then in turn forward (122) the VPC address prefixes to the CPE 108. The gateway 104(1) may also receive CPE prefixes from the CPE via the router 110.

Since the VxLAN tunnel is stateless, traffic from VPC VMs on a return path to CPE follows an optimized path orchestrated by a virtual networking data plane 118—it may be forwarded directly to the customer switch, bypassing the gateway 104(1). This can't provide BGP routing service to meet some user's requirement, because both the control and data planes converge at the customer switch.

However, handling all the packets in and out of the overlay network at the gateway also causes a variety of issues. For example, the network cannot conform to strict performance guarantees, except by overprovisioning, which results in waste (e.g., increased energy usage, increased heat, unused processing cycles, decreased hardware longevity); operation and management mechanisms specific to the overlay system have no visibility to the underlying transport topology, which hampers troubleshooting by necessitating toolkits that span both the overlay and underlay networks; and failures within the underlay that impact bisectional bandwidth across the fabric (e.g., when a link fails in an Ethernet bundle) are transparent to the superimposed overlays, unless a feedback mechanism propagates a state to the edge devices to perform head-end rerouting decisions or, in some fashion, some knowledge of the overlay traffic is exposed to the underlay so that the underlay transport steers critical flows away from a traffic congestion point caused by the failure. However, these are highly risky methods that may erode tenant traffic isolation from other tenants. Moreover, with the increasing number of ports and connections required by individual tenants, routing all packets in and out of the overlay network via the gateway may not provide the latency and PCC requirements specified in SLAs and/or (stable, non-beta) hardware may not exist that can handle the number of connections required or he hardware is prohibitively costly.

The subsequent figures and discussion describe techniques that overcome these and other deficiencies, improve provider architecture and resource provisioning.

Example Architecture

Figure 2:
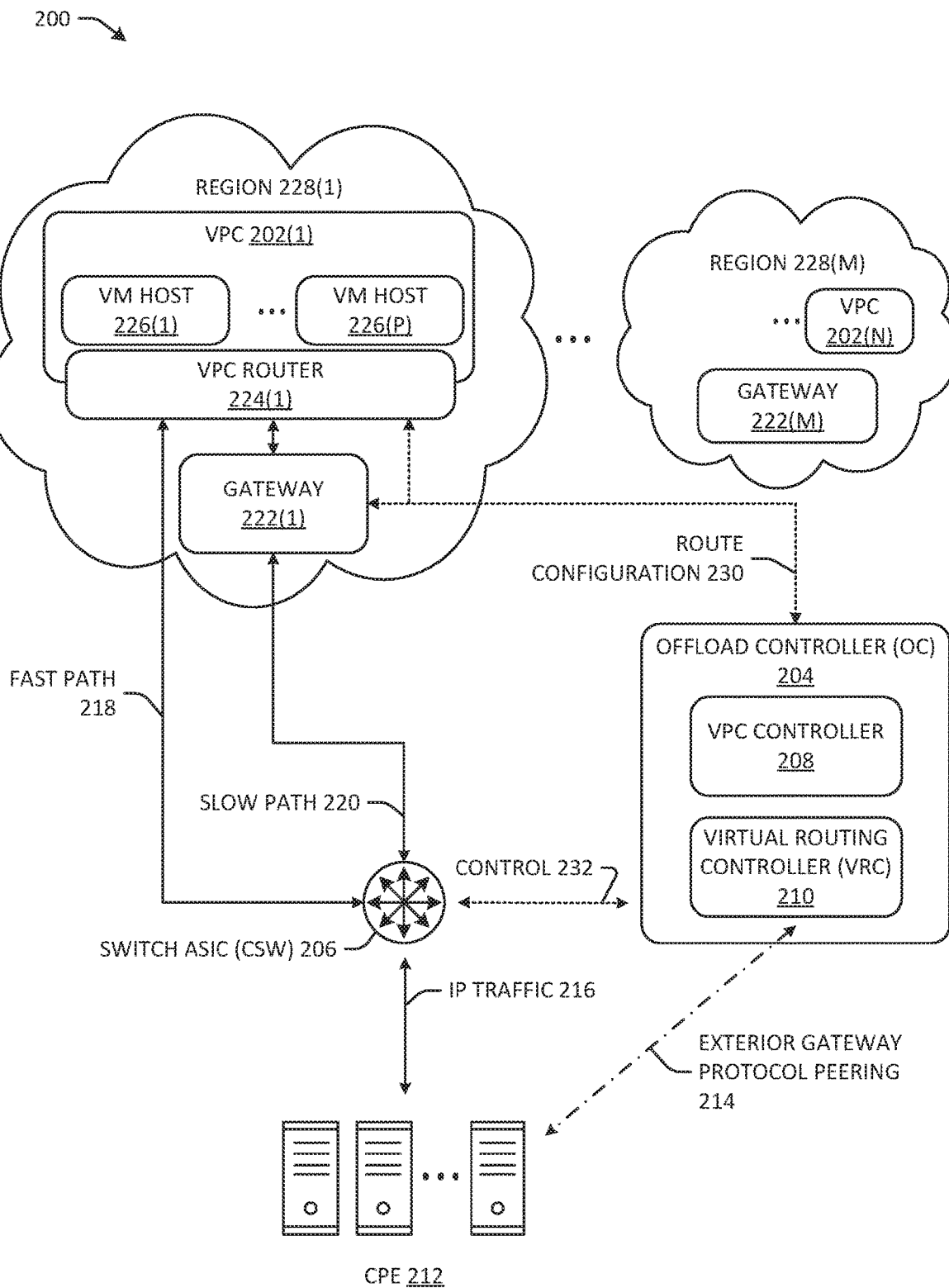
FIG. 2 illustrates a block diagram of an overview of an example network architecture for handling network traffic in and out of a virtual private cloud.

FIG. 2 illustrates a block diagram of an overview of example network architecture 200 according to techniques discussed herein for handling network traffic in and out of a provider core service, such as VPC 202(1). The operations of the components of the architecture are discussed in further detail in subsequent figures. The example network architecture 200 may include an OC 204 and/or a switch ASIC 206 ("CSW 206"). In some examples, the OC 204 may include a VPC controller 208 and/or a VRC 210. In some examples, the VRC 210 may remotely program and control the CSW 206. In some examples, the OC 204 and the CSW 206 may coordinate to bypass the gateway when handling tenant traffic and/or tenant network configuration (e.g., setting up subnets, connecting a subnet to the Internet, instantiating VM instances), in some instances.

In additional or alternate examples, the example network architecture 200 may isolate tenant traffic without using VRF. For example, (1) the CSW 206 may find the destination VPC (e.g., the VxLAN network identifier (VNI) corresponding to the VPC) based on an ingress packet's VLAN tag and/or destination IP (e.g., the VM IP address) and/or (2) the CSW 206 may find the IP address of the VM host (e.g., the VxLAN virtual tunnel end point (VTEP) address) based at least in part on the ingress packet's destination IP (e.g., VM IP address). In some examples, the CSW 206 may encapsulate the CSW 206 using the VPC VNI and/or VM host address.

The VRC 210 may additionally or alternatively be configured to peer CPE 212 and announce exterior gateway protocol (e.g., exterior gateway protocol (EGP), BGP, multiprotocol BGP (MP-BGP)) routes 214 to CPE 212 directly. In other examples, the CSW 206 may announce BGP routes 214 to CPE 212, route BGP route announcements from the VRC 210 to CPE 212, and/or the VRC 210 may announce BGP routes to CPE 212 itself. In at least one example, and without limitation, the VRC 210 may announce an MP-BGP route to the VPC controller 208 and/or the CPE 212 and the CSW 206 may forward the announcements to the CPE 212. In some examples, the VRC 210 may establish and/or maintain the BGP protocol session 214 and may learn the appropriate route by coordinating with the VPC controller 208, since the VPC controller 208 may include provider VPC information (e.g., network data, such as a MAC address and/or VxLAN address, associated with a physical machine upon which a particular VM instance is running) and/or client-defined information (e.g., a client-defined subnet, a client-defined IP address associated with the particular VM instance).

In some instances, the VRC 210 may also receive a user routing configuration from the CPE 212. For example, the user routing configuration may specify a new virtual switch instruction, a new subnet, and/or a new user-defined IP address to associated with a VM instance.

In some examples, the CSW 206 may receive and decode upstream packets included in Internet protocol (IP) (e.g., Q-in-Q, IPv4, IPv6) traffic 216 destined for an overlay network and/or may encode, as downstream IP traffic 216, downstream packets from an overlay network towards CPE 212. For example, IP traffic 216 may include a 5-tuple that may include a source address, a destination address (e.g., a VLAN address), a source port, a destination port, and/or a protocol number). Upon receiving an upstream packet bound for an overlay network (e.g., at least some of IP traffic 216), the CSW 206 may forward the packet via a fast-path 218 directly to a VPC 202(1) or via a slow-path 220 to a gateway 222(1) (or, in some instances, the slow-path may be directed to the OC 204).

For example, forwarding an upstream packet via the fast-path 218 may include decapsulating the packet (e.g., decapsulating the packets from VLAN) and/or encapsulating the packet destined for the VPC 202(1). The encapsulation frame format may include Virtual Extensible LAN (VxLAN), Network Virtualization Using Generic Routing Encapsulation (NVGRE), Transparent Interconnection of Lots of Links (TRILL), Location/Identifier Separation Protocol (LISP), and/or the like. As discussed in more detail below, the CSW 206 may maintain each connected state using a Connection Table (e.g., pushed to the CSW 206 from the VRC 210) and therefore may forward/encapsulate packets based at least in part on the Connection Table stored at the CSW 206. Therefore, fast-path 218 may be a VxLAN (and/or other encapsulation frame format) tunnel between the CSW 206 and the VPC 202(1).

In some examples, packets routed to the VPC 202(1) (e.g., by encapsulating them and forwarding them) may be received by a VPC router 224(1). In some examples, VPC router 224(1) may be a logical router that decapsulates the packet received via the fast-path and routes the packet to the appropriate VM host (e.g., one of 224(1)-(P)). In some instances, the VPC router 224(1) may include a virtual switch such as, for example, an application virtual switch (AVS), which may be a part of a hypervisor. In additional or alternate examples, the packet may be delivered directly to a VM host 226. Regardless, as used herein "forwarding a packet to the VPC 202(1)" ultimately causes the packet to be delivered to a destination VM host and/or VM instance. In some examples, a VPC 202 may comprise one or more VM hosts 226. A VM host 226(P) may comprise one or more core(s) and/or memory and/or a hypervisor that may create, run, and/or manage (host) one or more VM instances. In some examples, there may be multiple VPCs within an availability zone and/or region 228. For example, the m-th region, 228(M), is depicted as including up to N VPCs 202(N). In some examples, a region 228 may comprise one or more gateways 222 and the gateways of different regions may peer each other via an external border protocol session. In some examples, a gateway 224(1) associated with region 228(1) may be a peer to gateway 222(M) associated with region 228(M). In some examples, a dataplane may be established between gateways in different regions. Additionally, or alternatively, an individual VRC 210 may be assigned to a subset of CPEs connecting to VPC(s) within a region 228 and the region 228 may be associated with multiple VRCs. An individual VRC 210 may peer one or more VRCs in a different region. Moreover, there may be a hierarchy of VRCs within a single region (e.g., front-end VRC, back-end VRC, central VRC).

In some examples, forwarding the packet via the slow-path 220 may include forwarding the packet to a gateway 222(1) when no rule exists in the Connection Table at the CSW 206 for the packet (e.g., the packet includes a TCP SYN message, the VRC hasn't yet pushed a new entry to the CSW 206 for the connection associated with the packet, the packet creates a hash collision as discussed in more detail below). In such an instance, the gateway 222(1) may perform routing (e.g., identifying a fastest route to the VPC 202(1)), MAC address lookup, etc. in order to establish a connection between the CPE 212 and the VPC 202(1) and/or a VM host 226 associated with the VPC 202(1). In some instances, the CSW 206, when forwarding the packet via the slow-path 218, the CSW 206 may leave the packet encapsulated in VLAN, although other methods are contemplated.

In an example where a packet is forwarded to gateway 222(1), the gateway 222(1) may push connection state information to the OC 204 and/or the OC 204 may periodically pull new route configuration from the gateway 222(1) (230). For example, the route configuration may specify a MAC address, route, etc. associated with a pathway between CPE 212 and the VPC 202(1). In some examples, the VPC controller 208 may receive this data and may transmit at least some of it to the VRC 210 (230). The VRC 210 may, in turn, generate a virtual routing object (VRO) based at least in part on the portion of the user routing configuration, and may control (232) the CSW 206 by pushing (according to the VRO) an instruction to add and/or delete a rule to a Connection Table at the CSW 206 that causes subsequent packets received from the CSW 206 to be forwarded via the fast-path 218. The VRC 210 may thereby control operation of the CSW 206.

Additionally, or alternatively, the VRC 210 may control entries in the Connection Table (e.g., by transmitting instructions to add or delete an entry) based at least in part on a cache management policy at the VRC 210. In some instances, the cache management policy may comprise determining a least-recently used (LRU) connection and transmitting an instruction to delete an LRU entry corresponding to the LRU connection (and similar techniques), determining a most-recently used (MRU) connection and transmitting an instruction to add an MRU entry corresponding to the MRU connection (and similar techniques), and/or a machine-learned model that takes, as in put, a MRU connection (e.g., information about the CPE 212, the VPC 202(1), and/or the route therebetween) and outputs one or more other connections that are associated with a probability of being started that exceeds a threshold probability.

In other words, the machine-learned model is configured to receive data regarding a connection (e.g., a notification that a new connection was opened or restarted and/or associated network information) and the machine-learned model may determine a subset of connections that are likely to be started in the near future (e.g., in the next minute, in the next 5 minutes, in the next hour). For example, a certain user in an office of a certain company may tend to access a VM instance first and other users may subsequently arrive at the office and log in. The machine-learned model does not need to know these details but may learn, by an unsupervised learning technique, other connections that are likely to be opened based on observing one or more connections that become active.

In some instances, the CSW 206 may comprise an edge switch, e.g., a switch at a user-facing edge of the provider network, although the CSW 206 may be otherwise situated in other examples. In some examples, although a router would normally routes data at the network layer (layer 3) and bridges and a switch would route data at the data link layers (layer 2), the CSW 206 may be a switch that is configured to receive layer 3 traffic and route that traffic via a VxLAN tunnel with routing details specified by the Connection Table stored at the CSW 206.

Example Device(s)

Figure 3:
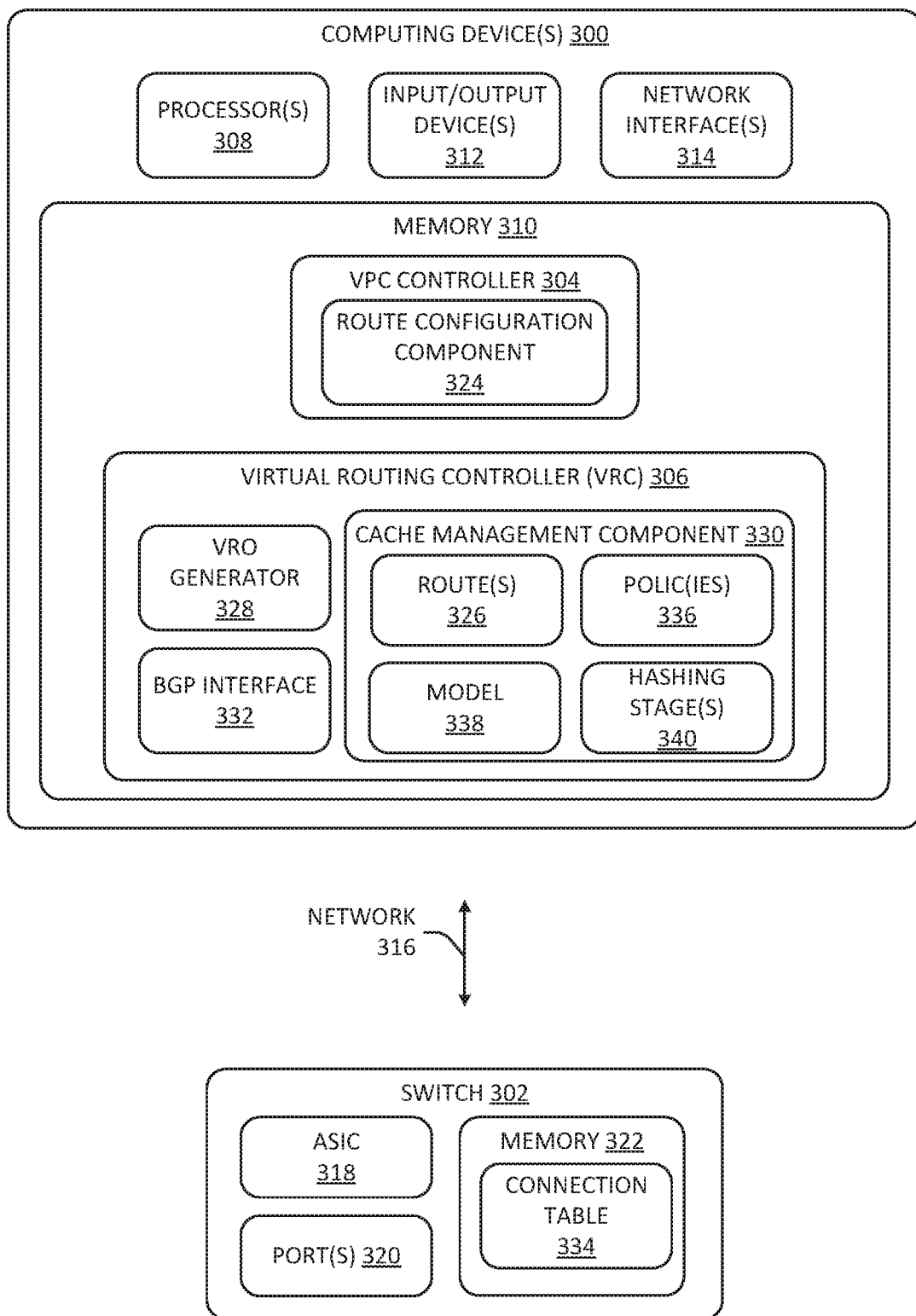
FIG. 3 illustrates a block diagram of example device(s) for handling network traffic in and out of a virtual private cloud.

FIG. 3 illustrates a block diagram of example device(s) 300 and a switch 302 for handling network traffic in and out of a virtual private cloud. Example device(s) 300 may be one or more devices that compose the OC 204. For example, example device(s) 300 may comprise a VPC controller 304 and/or a VRC 306, which may represent VPC controller 208 and VRC 210, respectively. In some instances, the VPC controller 304 and the VRC 306 may operate on a same machine or on different machines. In some instances, the computing device(s) 300 may comprise a server, such as a blade server. The computing device(s) 300 may comprise an x86, or similar, microprocessor configuration. For example, example device(s) 300 may comprise processor(s) 308, a memory 310, input/output (I/O) device(s) 312, and/or network interface 314 for establishing communications with other devices via a network 316. Switch 302 may represent CSW 206 and may comprise an ASIC 318, port(s) 320, and memory 322.

Processor(s) 308 may represent one or more processor such as, for example, a uniprocessor system including one processor, or a multiprocessor system including several processors (e.g., two, four, eight, or another suitable number). The processor(s) 308 may be any suitable processor capable of executing instructions. For example, in various implementations, the processor(s) 308 may be general-purpose or embedded processors implementing any of a variety of instruction set architectures (ISAs), such as the x86, ARM, PowerPC, SPARC, or MIPS ISAs, or any other suitable ISA. In multiprocessor systems, each processor 308 may commonly, but not necessarily, implement the same ISA. The processor(s) 308 may include one or more central processing units (CPUs) and/or one or more graphics processing units (GPUs). In at least one example, the processor(s) 308 comprise an x86 system.

Memories 310 and 322 may include a non-transitory computer readable media configured to store executable instructions/modules, data, and/or data items accessible by the processor(s) 308. In various implementations, the non-transitory computer readable media may be implemented using any suitable memory technology, such as static random access memory (SRAM), synchronous dynamic RAM (SDRAM), non-volatile/FLASH-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory computer readable media, or on similar media separate from the non-transitory computer readable media. Generally speaking, a non-transitory, computer readable memory may include storage media or memory media, such as FLASH (e.g., solid state memory), magnetic or optical media (e.g., a disk) coupled to the computing device(s) 300 and/or switch 302 and/or available via the I/O device(s) 312 and/or the network interface(s) 314 and/or port(s) 320. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface(s) 314 and/or port(s) 320.

The I/O device(s) 312 may include an I/O interface configured to coordinate I/O traffic between the processor(s) 308, the memory 310, the network interface(s) 314, and/or any other hardware of the example computing device(s) 300 and/or the provider network infrastructure. The I/O interface may perform protocol, timing, or other data transformations to convert data signals from one component (e.g., the non-transitory computer readable media) into a format suitable for use by another component (e.g., processor(s)). The I/O interface may include support for devices attached through various types of peripheral buses, such as the Peripheral Component Interconnect (PCI) bus standard, the Universal Serial Bus (USB) standard, or a variant thereof, for example. The function of the I/O interface may be split into two or more separate components, such as a north bridge and a south bridge, for example. Also, some or all of the functionality of the I/O interface, such as an interface to the memory 310, may be incorporated directly into the processor(s) 308 and/or one or more other components of the example computing device(s) 300 and/or provider network infrastructure. The I/O devices 312 may include external and/or internal speaker(s), display(s), input device(s), etc.

Network interface(s) 314 may be configured to establish a communication link (e.g., network 316) between the example computing device(s) 300 and other device(s) of the provider's network infrastructure and/or CPE. For example, the network interface 314 may be configured to allow data to be exchanged, such as with the switch 302. The network interface 314 may enable wireless communication via wireless general data networks, such as a Wi-Fi network, and/or telecommunications networks, such as, for example, cellular communication networks, satellite networks, and the like. In additional or alternate examples, the network interface 314 may include hard-wired connections between nodes of the provider's network infrastructure.

The memory 310 may store VPC controller 304 and/or VRC 306, each of which may be executable by the processor(s) 308 to cause the processor(s) 308 to accomplish the functions discussed herein. In some instances, the VPC controller 304 and/or VRC 306 may be executed at a same server as the gateway 222.

In some examples, VPC controller 304 may assign and/or track the physical machines (e.g., core(s), blade server(s), rack(s)) to which a VPC and/or VM instances are assigned within a provider's network infrastructure. Tracking the VPCs may comprise associating physical machine data with user data (e.g., an IP address associated with a user) and/or user-defined data (e.g., a subnet, a user-specified address). In some instances, the VPC controller 304 may track all the connections within a region and may peer VPC controller(s) of other regions. The VPC controller 304 may comprise a route configuration component 324 that tracks the VPCs in a region and/or may configure routes to the VPCs through the provider infrastructure. The VPC controller 304 may configure routes to the VPCs based at least in part on receiving a MAC address and/or other identifier(s) associated with a VM instance/VPC from a gateway, receiving cross-region routes from VPC controller(s) in other region(s), receiving user-defined network configuration instructions such as definitions of a virtual switch, subnet and/or route received from a VPC console (e.g., the CPE may provide these via an application programming interface (API) made available to the CPE), and/or BGP route announced by the VRC 306. In some instances, the VPC controller 304 may track, as connection state data, any of the information discussed above.

In some instances, the VPC controller 304 may push at least a subset of route data 326 to a VRC 306. For example, route data 326 may be a route configuration that comprises details of a connection, including the appropriate details for packets to be routed from the CPE to a VPC and vice versa. In some examples, there may be a hierarchy of VRCs within a provider's network infrastructure (e.g., a front-end of a network, a back-end of the network, or a central portion of the network). The VPC controller 304 may determine the subset of route(s) 326 (out of all the routes associated with all the active connections in a region) based at least in part on CPE(s) and/or VPC(s) associated with the VRC 306 (e.g., the VRC 306 may be controlling switch(es) and/or route(s) associated with those CPE(s) and/or VPC(s)). The VPC controller 304 may also determine to associate a VRC 306 with a particular subset of CPE(s) and/or VPC(s).

The VRC 306 may comprise a virtual routing object (VRO) generator 328, a cache management component 330, and/or an BGP interface 332. In some instances, upon receiving the route(s) 326 from the VPC controller 304, the VRO generator 328 may generate a VRO that comprises at least one of: an identifier of a virtual network segment associated with the CPE (e.g., a three-dimensional address space comprises the VPC and the subnet); an identifier of a virtual routing type (e.g., virtual switch and/or subnet, dedicated endpoint of a BGP session); attributes of the virtual network segment (e.g., the region, VPC, virtual switch); virtual routing data channel forwarding information (e.g., tunnel ID, gateway virtual IP address); network connectivity policy information (e.g., virtual network segment scope); a release scope (e.g., virtual router (VR), border router (BR), control cross point (CxP), may be bidirectional, outbound can reach and enter direction is arriving); a state of routing of the network traffic by nodes of the network (e.g., indication(s) of connectivity, routing, etc., that may include packet counts, successful delivery, failures, outages, etc.); an indication of a conflict or an absence of conflict (e.g., an indication that the VRC 306 identified a conflicting route in a layer associated with the VRC 306); an indication of one or more VRCs that have accepted the VRO; an indication that the VRO has been deployed at the switch 302; and/or an indication that the network traffic is successfully being routed between the CPE and a VPC.

The VRO may be executable by the processor(s) 308 and/or may comprise logical data. For example, the VRO may cause the VRC 306 to transmit a rule to the switch 302 when a connection is active, a route for the connection has been configured that doesn't conflict with other routes (thereby isolating tenants), etc. The VRO may also determine when to cause the switch 304 to delete a rule from the Connection Table 334, thereby stopping packets from being passed along a fast-path and/or a slow-path (or at all)—for example, as the VRO is executing, it may determine, based on data stored in the VRO, that a connection should be released, and the VRO may cause an instruction to be transmitted to the switch 302 that causes the switch 302 to delete an entry in the Connection Table 334 corresponding to the connection.

In other words, a VRC may configure packet forwarding policies for underlying data plane nodes such as, for example, switch 302, by the VROs associated with the connections managed by the VRC. Additionally, or alternatively, the VRC 306 may control VPC routing by calculating relevant BGP and/or MP-BGP routes (e.g., via the BGP interface 332) based at least in part on a network connectivity policy. These may also be included in the VRO since, in some examples, the switch 302 may forward BGP and/or MP-BGP announcements to CPE.

In some instances, the VRC 306 may comprise a cache management component 330. The cache management component 330 may determine a rule to transmit to the switch 304. In some instances, transmitting a rule to the switch 304 may comprise transmitting instructions to add an entry in a Connection Table 334 and/or delete an entry from the Connection Table 334. In some examples, transmitting the subset may be based at least in part on receiving, at the VRC 306 and from the switch 304, an indication that a matching entry was not found in the Connection Table 334 for a packet received at the switch 304 and/or an indication that a packet matches an entry in the Connection Table 334 when the packet comprises a synchronization message (and/or other session establishment message), such as a transmission control protocol (TCP) synchronization (SYN) message.

In some examples, the cache management component 330 may comprise cache management polic(ies) 336, a model 338, and/or hashing stage(s) 340. The cache management component 330 may determine a set of rules to push to the switch 302 based at least in part on the cache management polic(ies) 336 and/or an output of the model 338. For example, the cache management polic(ies) 336 may comprise one or more cache replacement policies such as, for example, determining a LRU connection, an MRU connection, a time-aware least recently used (TLRU) connection, a segmented LRU connection, low inter-reference recency set (LIRS) of connections, etc. The model 338 may comprise a machine-learned model generated using an unsupervised learning technique (although a supervised technique could be used, in other examples). The model 338 may therefore comprise a neural network, such as a random forest and/or boosted ensemble of decision trees; a directed acyclic graph (DAG) (e.g., where the nodes are organized as a Bayesian network); deep learning algorithm(s), such as artificial neural networks (ANN) (e.g., recurrent neural network (RNN), residual neural network (ResNet)), deep belief network (DBN), deep stacking network (DSN); etc. In some instances, the model 338 may receive, as input, one or more connections that became active, and based on those input(s), the model 338 may output an identification of one or more other connections.

Once the cache management component 330 has identified the subset of connections, the cache management component 330 may transmit rule(s) associated with the subset of connections and an instruction to the switch 302 via network 316 to insert and/or delete entr(ies) in the Connection Table 334. Note that the subset of rule(s) transmitted from the VRC 306 to the switch 302 corresponds to a subset of connections that the VRC 306 determines is or is likely to become active of the connections associated with route(s) 326 in the layer/region associated with the VRC 306, which is a further subset of all the active connections maintained by VPC controller 304.

In some examples, cache management component 330 may maintain the route(s) 326 as a fast table associated with a fast-path and/or a slow table associated with a slow-path. In some examples, for each connection managed by the VRC 306, the cache management component may store the following data in the fast-path table and/or the slow-path table, respectively:

TABLE 1

Fast-Path Table

| Key | | | Value | |
|---|---|---|---|---|
| Switch interface | VLAN Tag | Destination address (e.g., VM IP address) | VPC VxLAN Network Identifier (VNI) | VM Host IP Address (e.g., VTEP address) |

TABLE 2

Slow-Path Table

| Key | | | Value | |
|---|---|---|---|---|
| Switch Interface | VLAN Tag | Classless inter-domain routing (CIDR) identifier (e.g., destination subnet) | Global VxLAN Network Identifier (VNI) | Gateway IP Address (e.g., VTEP address) |

In some examples, the cache management component 330 may hash this table to conserve memory and/or because memory 322 at the switch 304 may be limited. In some instances, the cache management component 330 may use more than one hashing stage 340 to generate multiple digests. The VRC 306 may migrate an entry that collides with another entry in a single digest to a different hashing stage, thereby changing a first digest associated with the first entry (but not the underlying information. This migration of the entry may comprise generating a new digest including the entry using a salt (e.g., a cryptographic nonce upon which the hash function may be based) that is different than a salt originally used to generate a first digest.

In some examples, the switch 302 may comprise an ASIC 318 that is specifically designed for forwarding packets received at port(s) 320. To decide where to forward packets received at the port(s) 320 (whether the packets are ingress and/or egress packets), memory 322 may store a Connection Table 334 and may determine whether a received packet matches an entry in the Connection Table. In some instances, memory 322 may comprise a cache associated with the ASIC 318. Connection Table 334 may comprise a digest generated by hashing entries of the fast table and/or slow table. In some examples, an instruction received from the VRC 306 to add and/or delete an entry of the Connection Table 334 may cause the switch 302 to re-hash one or more entries of the Connection Table 334 to produce new digest(s), although, in some instances, the VRC 306 may conduct the hashing and may push the resultant digest(s) to the Connection Table 334 for entry. In some instances, the Connection Table 334 may comprise a 5-tuple associated with a VPC VNI and/or destination IP address. The 5-tuple may be the hash key and the VPC VNI and/or destination IP address may be the hash value. In some examples, the switch 302 may be an edge switch located at a user-facing edge of the provider's network, although the switch 302 may be alternately located.

Example Operation

Figure 4A:
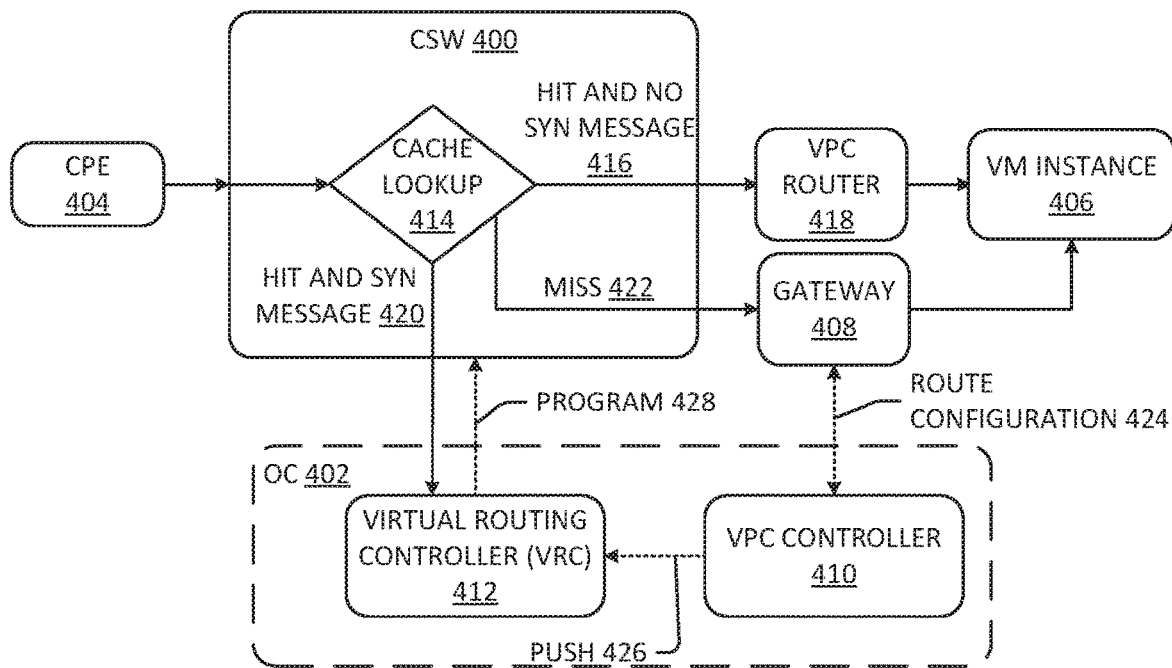
FIGS. 4A & 4B illustrate upstream and downstream operations, respectively, of a switch and/or offload controller.
Figure 4B:
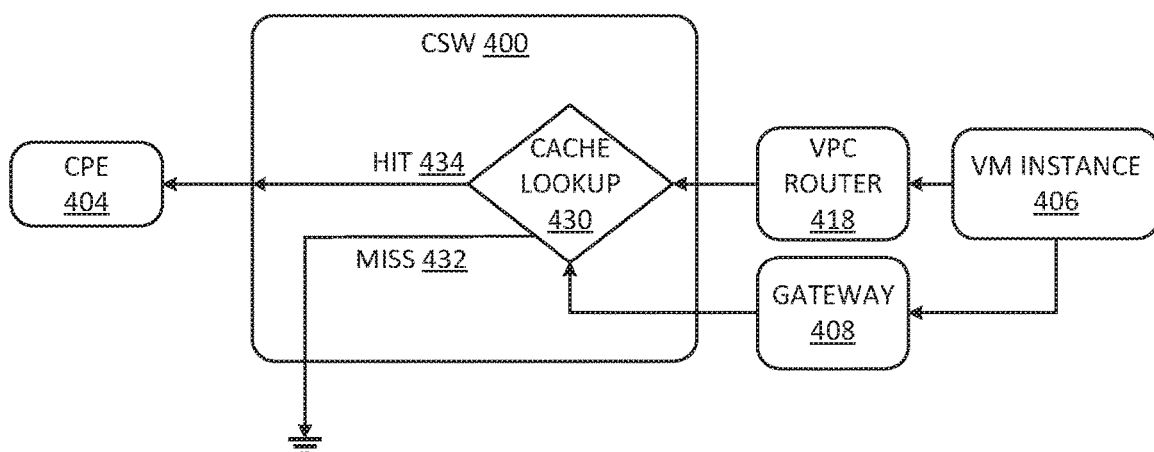

FIGS. 4A and 4B illustrate diagram of operations of a CSW 400 and an OC 402 that work together to route network traffic between CPE 404 and a VM instance 406, bypassing a gateway 408, in some instances. In some instances, the gateway 408 may be part of a hypervisor. As discussed above, the OC 402 may comprise a VPC controller 410 and/or a VRC 412 and that these components may execute on a same machine or different machines. Note that, although the discussion below refers to a VM instance 406 specifically, it is understood that packets may be delivered to another component of a VPC or VM host associated with a subnet defined by the user.

FIG. 4A illustrates upstream operation of the components discussed herein when an ingress packet is received from CPE 404 destined for VPC 406. In some instances, the CSW 400 may receive, at a port of the CSW 400, the ingress packet from the CPE 404 and, at operation 414, the CSW 400 may perform a lookup in the Connection Table to determine whether the ingress packet generates a hit with at least one entry in the Connection Table. In some examples, the CSW 400 may decapsulate the ingress packet before conducting the lookup (e.g., decapsulate from VLAN), although, in other instances, the ingress packet may remain encapsulated. The CSW 400 may use at least a portion of the data contained within the packet (e.g., at least a portion of the routing data in the packet header/footer) to determine whether or not the ingress packet generates a hit. For example, the CSW 400 may determine whether the plain data matches an entry in the Connection Table and/or CSW 400 may hash the data contained within the packet to see if the hashed data matches a hash key in the Connection Table. In some examples, the CSW 400 may ascertain whether the ingress packet matches a switch interface identifier, VLAN tag, and/or destination IP address (e.g., VM IP) in the fast-path table and/or a switch interface identifier, VLAN tag, destination subnet (e.g., CIDR block) in the slow-path table.

If the CSW 400 determines that the ingress packet generates a hit (416), the CSW 400 may forward the ingress packet to the VPC router 418, which may include encapsulating the ingress packet, and the VPC router 418 may decapsulate the packet and forward the packet to the appropriate VM host running the VM instance 406. This is the fast-path. In some examples, the VPC router 418 may be a virtual switch. In some examples, the CSW 400 may encapsulate the ingress packet using a VxLAN protocol (or any other layer 3 protocol) specifying a VPC VNI and/or a VTEP address for the VM host. For example, the CSW 400 may use a VLAN tag and destination IP address (e.g., VM IP address) to find the destination VPC, which may be mapped to a VNI, and, after identifying the destination VPC, the CSW 400 may find the IP address of the VM host (e.g., the VxLAN VTEP address) using the destination IP. In some examples, each VNI/VPC may be mapped to different destination VTEPs for different VM hosts in the same VPC. In some instances, each VLAN tag may be mapped to different VNIs for different VPCs. Mapping each VNI/VPC to different destination VTEPs for different VM hosts in the same VPC may increase network and server resource utilization, reduce power consumption, and/or free up CPU and memory, thereby increasing computational bandwidth available to be occupied by tenant(s).

In some instances, after determining that the ingress packet generates a hit, the CSW 400 may also determine whether the ingress packet includes a synchronization message, such as a TCP SYN message, that is attempting to set up a connection. If not, the CSW 400 may forward (416) the ingress packet to the VPC router 418. However, if the ingress packet includes a TCP SYN message and matches an entry in the Connection Table, instead of forwarding the ingress packet to the appropriate VPC router 418, the CSW 400 may transmit a notification and/or the ingress packet to the VRC 412 (operation 420).

In instances where the ingress packet includes a synchronization message and matches an entry in the Connection table, the CSW 400 may transmit the notification and/or the ingress packet to the VRC 412 because it is likely that there is a hash collision (e.g., where hashing two different sets of data results in a same digest). The CPE 404 may send a synchronization message when the CPE 404 is initializing a connection, therefore there shouldn't be an entry in the Connection Table yet because no connection has been configured and therefore the VRC 412 has yet to push a rule to the CSW 400.

After receiving the notification and/or the ingress packet, the VRC 412 may configure a route for the ingress packet (e.g., by communicating with the VPC controller 410 and/or the gateway 408), forward the ingress packet via the route, generate a new rule for the ingress packet, and/or push the new rule to the CSW 400. To avoid the hash collision problem, the VRC 412 may generate the rule by hashing entr(ies) in the fast table and/or slow table using a different stage and/or a different salt than that used for the entry that caused the hash collision. Information identifying the entry that caused the collision may be included in the notification transmitted from the CSW 400 to the VRC 412.

If the CSW 400 determines that the ingress packet does not match any of the entries in the Connection Table (operation 422, "miss"), the CSW 400 may forward the ingress packet to the gateway 408 so that the gateway 408 may conduct routing and/or MAC address lookup to correctly route the ingress packet. The gateway 408 may then forward the ingress packet to the VM instance 406. This is the slow-path.

In some examples, the gateway 408 and the VPC controller 410 may coordinate to conduct route configuration (424) (e.g., when a packet is forwarded to the gateway 408 via the slow-path and no route/connection has been configured, when a route conflict occurs). For example, the VPC controller 410 may receive cross-region routes, BGP announcements (from the VRC 412), user-defined network configurations (e.g., subnet definitions, user-defined IP addresses), etc. and may receive the MAC address associated with the VM instance and may configure a route from the CPE to the VM instance.

Once the route configuration is complete, the VPC controller 410 may store the route configuration in association with the CPE 404 and this new connection. The VPC controller 410 may push (426) at least some of the route configuration data to the VRC 412 and the VRC, in turn, may program (428) the CSW 400 to add an entry to the Connection Table associated with the new connection so that subsequent packets received from the CPE 404 may be routed via the fast-path. As discussed above, the VRC 412 may be one of a plurality of VRCs organized hierarchically, so the VRC 412 may be responsible for handling a subset of all the connections in a region and therefore may control one or more switches. Therefore, in some examples, the VPC controller 410 may determine that VRC 412 is the appropriate VRC 412 for handling the connection (e.g., using load balancing techniques and/or because the VRC 412 is associated with provider resources that have been allocated to the CPE 404) before transmitting the route configuration information to the VRC 412.

FIG. 4B illustrates downstream operation of the components discussed herein when an egress packet is received from VM instance 406 destined for CPE 404. In some examples, an egress packet received at the CSW 400 from the VPC 406 (e.g., via the fast-path via VPC router 418, via the slow-path via gateway 408) may encapsulated in a VxLAN header. Upon receiving the egress packet, the CSW 400 may conduct a cache lookup 430 to determine whether a VNI associated with the egress generates a hit in an egress table. Additionally, or alternatively, upon receiving the egress packet and/or generating a hit in the egress table, the CSW 400 may decapsulate the egress packet.

If the cache lookup 430 does not generate a hit (miss 432), the CSW 400 may discard the packet and/or the CSW 400 may forward the packet and/or a notification to the OC 402 and/or a hypervisor associated with VM instance 406.

If the cache lookup 430 generates a hit (434), the CSW 400 may decapsulate the egress packet from a VxLAN header and/or may encapsulate the egress packet using VLAN or a similar protocol, if the VM instance 406 (or VPC router 418 or gateway 408) didn't already encapsulate the egress packet using a VLAN protocol. For example, the VLAN header/tag may specify a switch interface, VLAN tag, and next hop ID so that the CSW 400 may appropriately forward the egress packet so that it arrives at the CPE 404.

Example VRC and CSW Operations

Figure 5:
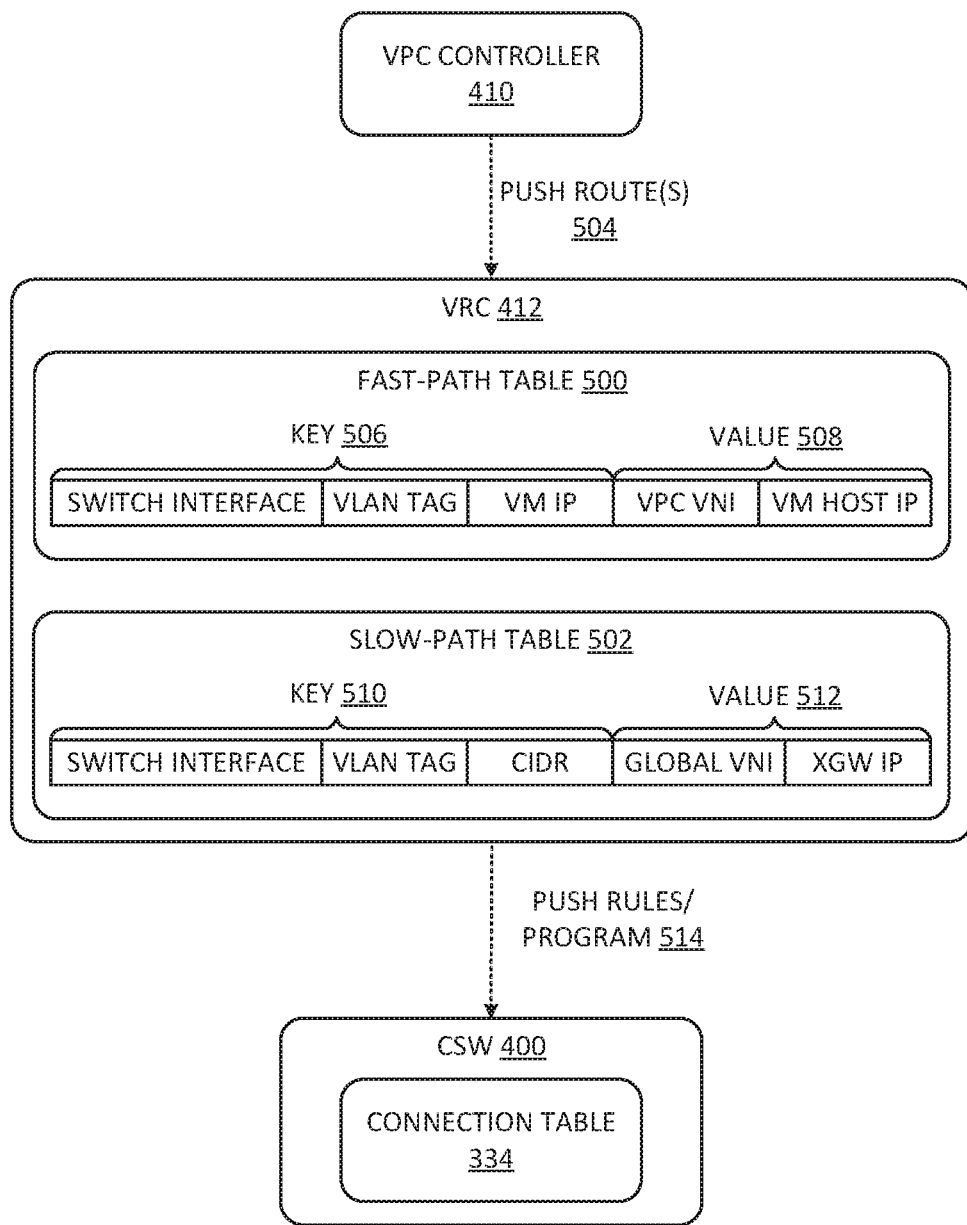
FIG. 5 illustrates a block diagram of a virtual routing controller that stores an example fast-path table and/or a slow-path table and pushes rules related thereto to a switch.

FIG. 5 illustrates a block diagram of a VRC 412 that stores an example fast-path table 500 and/or a slow-path table 502 and pushes rules related thereto to a CSW 400. In some instances, the VPC controller 410 may push a set of route configuration(s) (504) to the VRC 412. In some instances, the set of route configuration(s) may be associated with a subset of connections in a region associated with the VPC controller 410 and the VRC 412 may be responsible for managing that subset of connections. In some instances, the VRC 412 may store the route configuration(s) 504 as a key-value pair in a hash table. Tables 500 and/or 502 may comprise a hash table.

For example, a key 506 of the fast-path table 500 may map a VLAN tag and/or destination address (e.g., VM IP) to a value 508, which may be a VNI associated with a VPC. Additionally, or alternatively, the destination address (e.g., VM IP) and/or VNI may map to a VM host address, which may include a VTEP address such as a VxLAN tunnel endpoint address. In other words, a VPC may be mapped to different destination VTEPs for different VM hosts in the same VPC. In some instances, the VTEP may be located within the hypervisor that contains the VM instance to which a packet is addressed (and the hypervisor may perform routing functions between VMs when the hypervisor is running multiple VMs).

In some examples, a key 510 of a slow-path table 502 may map a VLAN tag and/or CIDR block identifier (e.g., a subnet identifier) to a value 512, which may include a global VNI (e.g., a range and/or pool of VNIs) and/or a gateway IP address (e.g., a VTEP address that terminates at the gateway 408).

Additionally, or alternatively, the keys 506 and/or 510 may include a switch interface identifier that may identify an entry/exit point of the provider network (e.g., a trunk port, an IP interface to an IP network, a rack, a network controller, a leaf/spine).

The VRC 412 may push an instruction to insert at least one of these entries, from the fast-path table 500 and/or the slow-path table 502, into the Connection Table 334 at the CSW 400, thereby programming (514) the CSW 400 to forward packets via a route associated with the at least one entry. In some instances, the VRC 412 may push the entry as a "rule" which may include any portion of a 5-tuple of the fast-path table 500 and/or the slow-path table 502. In some instances, the rule pushed to the CSW 400 may be a digest that was produced by hashing an entry of the fast-path table 500 and/or the slow-path table 502.

As discussed above, the VRC 412 may determine a subset of the fast-path table 500 and/or the slow-path table 502 to transmit to the CSW 400 based at least in part on a cache management policy 336 and/or a model 338 stored at the VRC 412.

Figure 6:
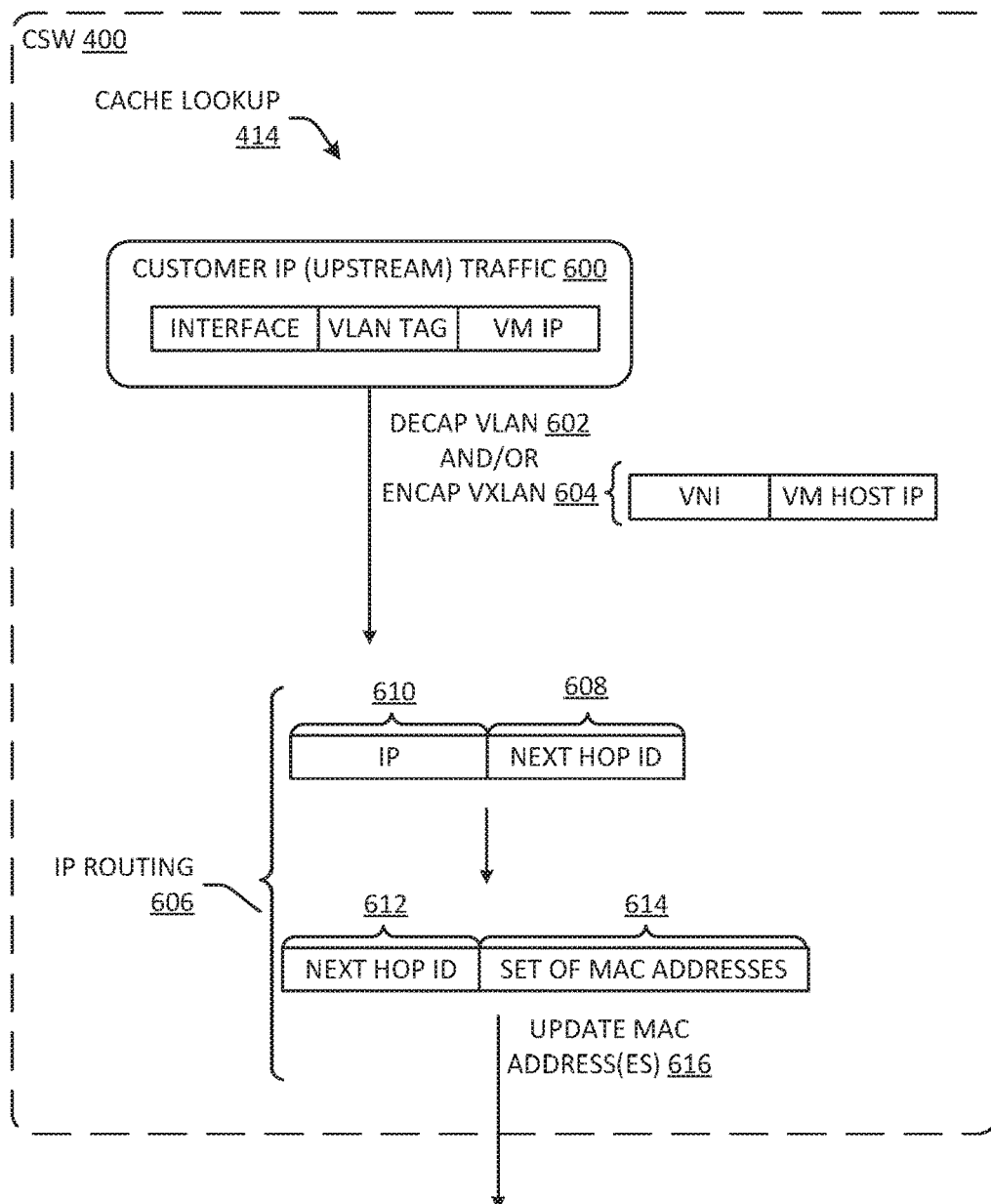
FIG. 6 illustrates a block diagram of an example cache lookup and packet forwarding at the switch using a fast-path.

FIG. 6 illustrates a block diagram of an example cache lookup 414 and packet forwarding at the CSW 400. In some examples, when the CSW 400 receives user IP (upstream/ingress) traffic, which may include an interface identifier, VLAN tag, and/or VM IP address. The CSW 400 may decapsulate (602) the traffic (e.g., from VLAN) and/or use a fast-path table (if available, such as when a connection has been established for CPE associated with the traffic) to identify a VNI and/or VM host IP address with which to encapsulate (604) the traffic (e.g., in a VxLAN tunnel terminating at the hypervisor running on the VM host). The CSW 400 may then forward the traffic to subsequent nodes in the network, which may include conducting IP routing 606, according to any techniques, such as by identifying a next hop identifier 608 based at least in part on an IP address 610. Key 610/value 608 pair may be part of the Connection Table 334, in some examples. At this point the CSW 400 may forward the traffic to a next node associated with the next hop ID and/or the CSW 400 may additionally, or alternatively, identify a set of MAC addresses 610 associated with the next hop ID 608/612. The CSW 400 and/or an upstream node may update MAC address(es) 614 associated with the set of MAC address(es) 608. These MAC address(es) may be used by nodes to forward the traffic to the VM host.

Figure 7:
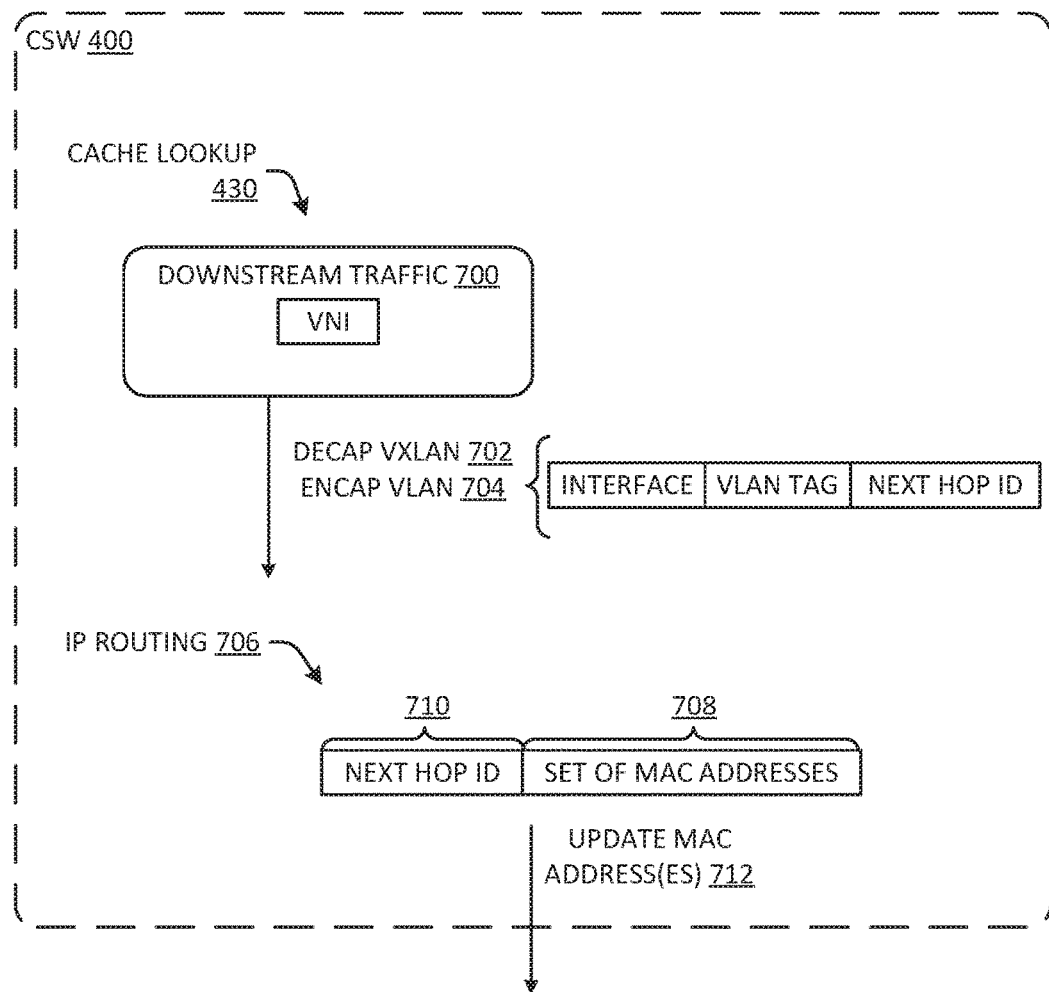
FIG. 7 illustrates a block diagram of an example cache lookup and packet forwarding at a switch using a slow-path.

FIG. 7 illustrates a block diagram of an example cache lookup 430 and packet forwarding at the CSW 400. In some examples, when the CSW 400 receives downstream traffic 700 destined for CPE (e.g., from a VPC/VM host, encapsulated in VxLAN), the CSW 400 may determine a VNI associated with the downstream traffic. Based at least in part on this VNI, the CSW 400 may determine a switch interface identifier, VLAN tag, and/or next hop ID associated with the VNI. In some examples, the VNI may be mapped to the switch interface identifier, VLAN tag, and/or next hop ID in an egress table stored in the Connection Table at the CSW 400.

If the CSW 400 determines that the VNI is not associated with data in the egress table, the CSW 400 may discard the traffic and/or may notify the VRC, VPC, and/or VPC controller. If the CSW 400 determines that the VNI is associated with data in the egress table, the CSW 400 may decapsulate (702) the downstream traffic (e.g., by decapsulating the traffic from a VxLAN header) and/or encapsulate (704) the downstream traffic (e.g., using a VLAN protocol, the switch interface identifier, VLAN tag, and/or next hop ID). The CSW 400 and/or an upstream node may additionally, or alternatively, conduct IP routing 706, which may comprise identifying a set of MAC addresses 708 associated with the next hop ID 710 and updating MAC address(es) 712 for forwarding the traffic.

Example VPC Controller & VRC

Figure 8:
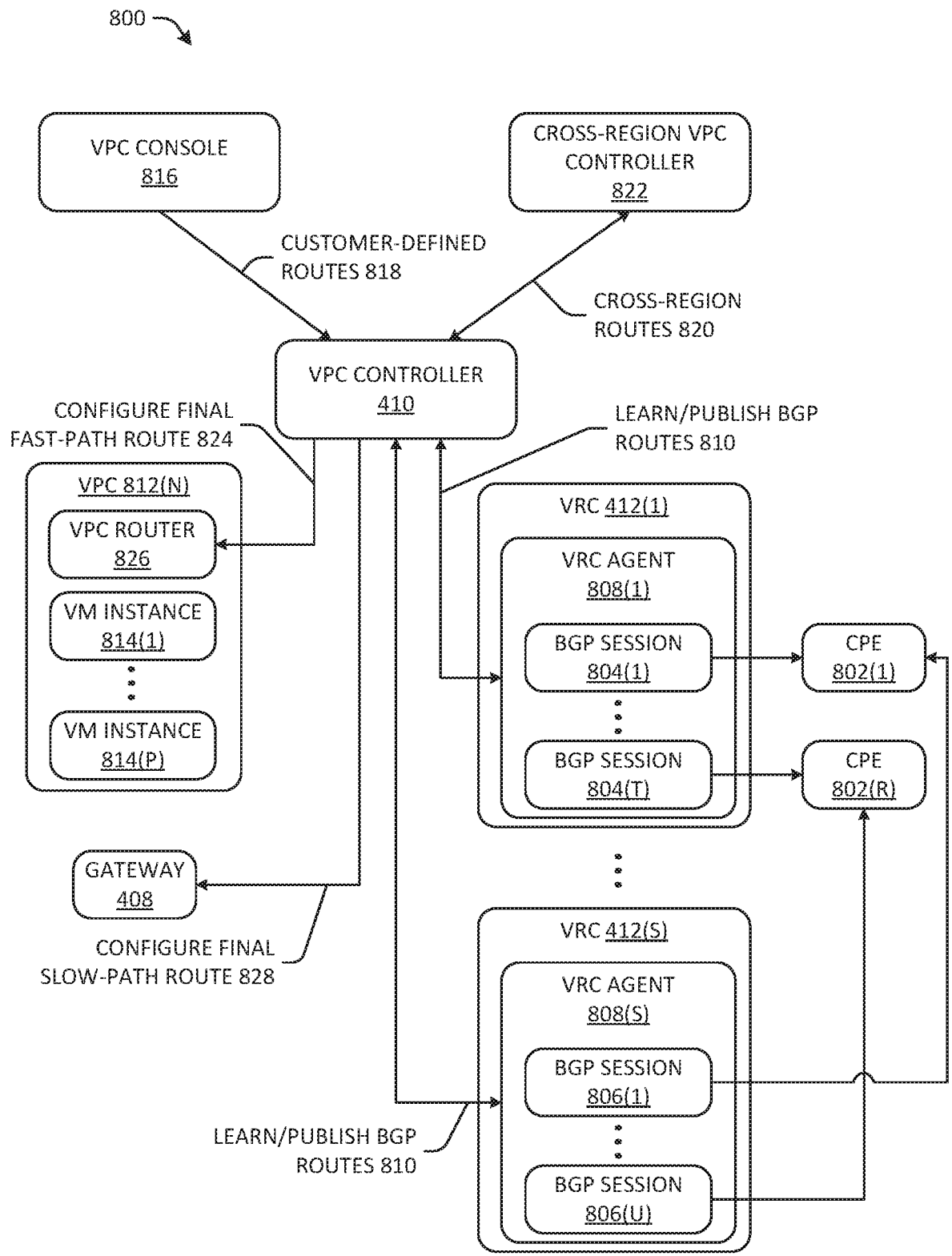
FIG. 8 depicts a block diagram of an example offload controller architecture that includes a VPC controller and/or a VRC for determining a route for a connection, maintaining the connection state, announcing routes to CPE, and/or controlling a switch.

FIG. 8 depicts a block diagram of an example offload controller architecture 800 that includes a VPC controller 410 and/or a VRC 412 for determining a route for a connection, maintaining the connection state, announcing routes to CPE 802(1)-(R), and/or controlling a CSW. In some examples, there may be multiple VRCs 412(1)-(S). The VRCs 412(1)-(S) may be organized hierarchically such that each VRC is associated with a different portion of the provider network. For example, a respective VRC may be assigned a subset of connections of all the active connections in a network and/or the VRC may operate at a different depth of the network (e.g., front-end, back-end, center, layer 2, layer 3). Note that from here on the VRCs are discussed collectively and/or individually as VRC 412. In other words, any one or more of the VRCs 412(1)-(S) may accomplish the actions discussed herein.

In some examples, by using the VRC, the CSW does not need to be segmented using VRF, and CPE 800(R) may communicate (transmit commands, instructions, packets, user-defined routes, etc.) directly to the VRC 412 via BGP and/or MP-BGP (e.g., BGP sessions 804(T) and 806(U) run by the VRC agent 808(S)). In some examples, the user may communicate with the VRC 412 via an API, such as OpenAPI, Swift, etc.

In some instances, traffic between CPE 802(R) and the VRC 412 may pass through CSW 400, but the CSW 400 may transfer traffic from CPE 802(R) to the VRC 412 (and vice versa), thereby allowing the user to talk directly to the VRC 412. Therefore, CSW 400 is not illustrated in this figure. Deploying the VRC for a subset of the active connections in a region may also replace and/or supplement a load balancer in front of the VPCs. In other examples, which may be disadvantaged, the gateway 408 may announce BGP routes to CPE. In some examples, the gateway 408 may be replaced entirely by the VPC controller 410, VRC 412, and/or CSW 400.

In some examples, the user may transmit a user-defined rule/route configuration (e.g., a new subnet, a new virtual switch instruction, user-defined IP address to associate with a VM) to the VRC 412 and the VRC 412 may transmit at least a portion of the user-defined rule/route configuration to the VPC controller 410. In some examples, the VPC controller 410 may be centrally located in a network topology of the provider's network, although other techniques are contemplated.

The VRC 412 may publish (808) BGP and/or MP-BGP routes to CPE 802(1)-(R) & VPC controller 410 and/or any other nodes. The VPC controller 410 may ultimately be responsible for managing the VM hosts (e.g., physical machine and/or hypervisors) upon which VM instances are running, which may include migrating VM instances/hypervisors, instantiating VM instances, assigning resources (e.g., particular core(s)/physical machines) to a particular VPC, tracking routing data (e.g., MAC addresses, IP addresses) associated with resources assigned to a VPC, etc.

For example, as regards an n-th VPC 810(N), the VPC controller 410 may allocate one or more physical machines (e.g., processor cores and/or memory) to the VPC 810(N) and CPE 802(R) may call for a VM instance 812(P) to be instantiated in associated with a user-defined IP address and a private subnet (e.g., responsive to an instruction received from a user via VPC console 814). The VPC controller 410 may receive, from the VRC 412(S) and/or VPC console 814, the user call for a VM instance to be instantiated and a user route configuration, and may configure a connection and route details through the provider network so that traffic between VM 812(P) and CPE 802(R) is isolated from other tenants. To achieve isolation and successful packet routing, the VPC controller 410 may receive user-defined routes (816) from a VPC console (e.g., an API interface) and/or from the VRC(s) 412, cross-region routes 818 from a VPC controller 820 associated with a different region that peers the VPC controller 410 (e.g., this may include negotiating routes with the VPC controller 816 so that VPC 808(N) may span multiple regions without creating a routing conflict), learning the BGP routes (808) received from VRC(s) 412, configuring a final fast-path route (822) with VPC router 824, and/or configuring a final slow-path route (826) with gateway 408.

In some instances, VPC router 824 may comprise a virtual switch within a hypervisor and the VPC controller 410 may configure the final route (822) as a fast-path connection by communicating with the VPC router 824 to set up the VPC router 824 as an endpoint of a VxLAN tunnel from the CSW 400. Setting up the VPC router 824 as an endpoint of the VxLAN tunnel may comprise mapping the VPC 810(N) to a VNI and/or mapping the VPC VNI, switch interface, VLAN tag, and/or VM IP address (one or more of which may be user-defined, rather than provider-defined), to the VPC router 824. The VPC controller 410 may then push routing data related to this fast-path connection to the VRC 412(S) responsible for a connection between CPE 802(R) and VM 812(P), e.g., for entry in the fast-table stored at the VRC 412(S). In turn, the VRC 412(S) may transmit instructions to the CSW 400 to insert an entry in the Connection Table associated with the connection, based at least in part on a cache management policy and/or model output, as discussed further above.

In some examples, the VPC controller 410 may configure a final route (824) with the gateway 408 as a slow-path connection by communicating with the gateway 408 (which may be associated with the VM host upon which the VM 812(P) is running) to set up a connection between the CSW 400 and the gateway 408. The VPC controller 410 may then push routing data related to this slow-path connection to the VRC 412(S) responsible for a connection between CPE 802(R) and VM 812(P), e.g., for entry in the slow-table stored at the VRC 412(S). In turn, the VRC 412(S) may transmit instructions to the CSW 400 to insert an entry in the Connection Table associated with the connection, based at least in part on a cache management policy and/or model output, as discussed further above.

In some examples, the VRC(s) 412 may automate user-specified network connectivity policies to automate multi-zone multi-VPC virtual networks, automatically detect address conflicts and control routing changes to ensure that network connectivity and user traffic are not affected and interrupted (even when provider network topology changes frequently, such as when a VM instances is migrated to a new virtual switch or subnet), and/or may provide users with the ability to customize network connectivity policies.

For example, based at least in part on user-specified network connectivity policy (e.g. a "routing configuration"), the VRC 412 may calculate the relevant BGP route and may configure packet forwarding policies to the underlying data plane nodes. In some instances, a single VRC 412 may operate in multiple network topology layers and/or a disparate VRC may be allocated to each different network topology layer. For example, the layers may comprise a VR layer where the VRC may manage and controls the current VR/VPC connectivity and routing (e.g., VPC peering), a BR layer where the VRC may manage and control the current BR connectivity and routing (e.g., cross-region VPC peering), and/or a CxP layer where the VRC may manage and control the current CxP connectivity and routing (e.g., cross-region multi-BR VPC peering).

In some instances, the VRC 412 may comprise VROs that include executable and/or logical components for accomplishing this management and control. For example, a VRO may comprise: an identifier of a virtual network segment associated with the CPE (e.g., a three-dimensional address space comprises the VPC and the subnet); an identifier of a virtual routing type (e.g., virtual switch and/or subnet, dedicated endpoint of a BGP session); attributes of the virtual network segment (e.g., the region, VPC, virtual switch); virtual routing data channel forwarding information (e.g., tunnel ID, gateway virtual IP address); network connectivity policy information (e.g., virtual network segment scope); a release scope (e.g., virtual switch, VR, BR, CxP, may be bidirectional, outbound can reach and enter direction is arriving); a state of routing of the network traffic by nodes of the network (e.g., indication(s) of connectivity, routing, etc., that may include packet counts, successful delivery, failures, outages, etc.); an indication of a conflict or an absence of conflict (e.g., an indication that the VRC 306 identified a conflicting route in a layer associated with the VRC 306); an indication of one or more VRCs that have accepted the VRO; an indication that the VRO has been deployed at the switch 302; and/or an indication that the network traffic is successfully being routed between the CPE and a VPC.

In some examples, an active VRC (e.g., a VRC that is currently configuring a connection/VRO associated therewith) may communicate with the VPC to establish the management and control terms and/or route configuration to generate the VRO and, after successful generation of the VRO, the active VRC may exchange VROs (including the newly generated VRO) with VRCs in a layer above and/or below the active VRC. The VRC(s) in the other layers may choose to accept or reject the VRO based at least in part on whether the VRO creates a conflict in layer(s) associated with the other VRC(s). Upon acceptance of the newly generated and exchanged VRO, the active VRC may implement the network connectivity policy and the routing control by operating the VRO. In some instances, the VRC 412 may generate a VRO for each CPE 802.

A description of VRO generation and exchange to guarantee at least upstream isolation follows. In some examples, the VRO exchange may comprise a first VRC of the bottom-most layer (e.g., a virtual switch layer) to generate an initial VRO and to check whether there is a routing conflict and accept or reject the current virtual routing decision (e.g., made by the VPC controller 410 and/or another VRC 412). If the VRC accepts the routing decision, the VRC may make an indication that the VRO was accepted at the layer associated with the first VRC and the first VRC may pass the VRO to a VRC associated with an upper and/or lower layer compared to a layer associated with the first VRC, and so on until all relevant VRCs have accepted the VRO. For example, the relevant VRCs may be the VRCs that control network connectivity for the connection being routed and/or a VRC associated with the highest layer that is relevant to a new/modified connection and all VRCs of layers below (e.g., if a change is made at the BR layer (e.g., a user defines a new subnet), the relevant VRCs may include a VRC associated with the BR layer and a VRC associated with the VR layer, but not a VRC associated with the CxP layer). In some instances, a user-specified scope may determine the extent of VRCs reached by the VRO.

In some instances, if VRO(s) accepted at a highest layer of a user-defined scope is detected as being down/down between the VRCs, a VRC associated with at least one of the highest layer or any layer below may check whether there is a routing conflict. If a VRC detects a routing conflict, the VRC may stop the downlink process by transmitting an instruction to the CSW 400 and/or the VRC may transmit an identification of the conflicting route to the underlying data forwarding nodes via the VPC controller.

Example Clauses

A. A switch comprising: a port that is configured to send and receive network traffic comprising packets; an application-specific integrated circuit (ASIC); a memory storing a set of instructions that, when executed, cause the ASIC to: receive a packet via the port; determine to forward the packet via a first path instead of a second path, wherein the first path comprises forwarding the packet to at least one of a virtual private cloud (VPC) or a virtual machine (VM) host, and wherein the second path comprises forwarding the packet to a gateway; and forward the packet via the first path.

B. The switch of paragraph A, wherein forwarding the packet via the first path comprises bypassing the gateway.

C. The switch of either paragraph A or B, wherein the memory further stores a connection table and wherein determining to forward the packet via the first path comprises: determining that the packet includes a virtual local area network (VLAN) tag and a destination IP address that match an entry in the connection table; identifying, from the connection table and based at least in part on at least one of the VLAN tag or the destination IP address, a virtual extensible local area nework (VxLAN) network identifier (VNI) associated with the VPC to which the packet is destined; and identifying, from the connection table and based at least in part on the destination IP address, a VxLAN tunnel endpoint (VTEP) address associated with the VM host to which the packet is destined.

D. The switch of any one of paragraphs A-C, wherein determining to forward the packet via the first path is based at least in part on a connection table and wherein the memory further stores the connection table, the connection table comprising: a first entry corresponding to a first active connection between first customer equipment and a first VPC; and a second entry corresponding to a second active connection between second customer equipment and a second VPC.

E. The switch of any one of paragraphs A-D, wherein forwarding the packet via the first path comprises encapsulating the packet in a VxLAN frame and forwarding it to at least one of a VPC router or the VM host.

F. The switch of any one of paragraphs A-E, wherein: the switch is deployed as part of an edge of a network architecture, and upstream network traffic received at the port comprises an Internet layer protocol.

G. The switch of any one of paragraphs A-F, wherein the instructions further cause the ASIC to: receive, at the port and from the VPC, an egress packet; identify, based at least in part on a virtual extensible local area network (VxLAN) network identifier (VNI) associated with the egress packet and a connection table stored in the memory, at least one of a virtual local area network (VLAN) tag or a next hop identifier; forward, based at least in part on the VLAN tag and towards customer equipment, the egress packet.

H. A method for network traffic routing and isolation comprising: receiving, at a switch application-specific integrated circuit (ASIC), an ingress packet that includes first data; performing a lookup in a connection table to determine whether the first data generates a hit or a miss, wherein the connection table is stored on memory accessible to the switch ASIC; and forwarding the ingress packet to at least one of a virtual private cloud (VPC) router or a virtual machine (VM) host, based at least in part on the lookup generating a hit; or forwarding the ingress packet to a network gateway, based at least in part on determining that the first data generates a miss.

I. The method of paragraph H, wherein: an entry of the connection table comprises a key-value pair; and generating the hit comprises determining that the first data comprises a layer B identifier and a destination address that match a key of the entry.

J. The method of either paragraph H or I, wherein forwarding the ingress packet to at least one of the VPC router or the VM host comprises: encapsulating, as an encapsulated packet, the ingress packet based at least in part on an overlay identifier associated with a VPC for which the ingress packet is destined, the overlay identifier being at least part of a value associated with the key; and forwarding the encapsulated packet to the VPC router based at least in part on a VM host address associated with the entry, the VM host address being at least part of the value associated with the key.

K. The method of any one of paragraphs H-J, wherein: generating a miss comprises determining that the first data does not match an entry in the connection table; and forwarding the ingress packet to the network gateway is based at least in part on at least one of an identifier of the destination subnet and a corresponding gateway address.

L. The method of any one of paragraphs H-K, further comprising: receiving, at the network gateway, the ingress packet; generating routing information associated with the ingress packet; forwarding, based at least in part on the routing information, the ingress packet to at least one of the VPC router or the VM instance; and pushing the routing information to an offload controller.

M. The method of any one of paragraphs H-L, further comprising: receiving, at the offload controller and from the network gateway, the routing information; generating, based at least in part on the routing information, a key-value pair; and pushing, to the switch ASIC, an insertion of the key-value pair to connection table stored at the switch ASIC.

N. The method of any one of paragraphs H-M further comprising receiving an egress packet including a virtual extensible local area network (VxLAN) network identifier (VNI); determining whether the VNI exists in the connection table; and forwarding the egress packet to customer equipment, based at least in part on determining that the VNI corresponds to at least one of a VLAN tag or a next hop identifier in the customer equipment; or forwarding the egress packet to the gateway or discarding the egress packet, based at least in part on determining that the VNI does not match an entry in the connection table.

O. A non-transitory computer-readable medium having a connection table and a set of instructions that, when executed, cause an application-specific circuit (ASIC) associated with a network switch to: determine that a first virtual local area network (VLAN) tag and a destination address match at least part of an entry of the connection table, wherein a first ingress packet includes the first VLAN tag and wherein the first destination address is associated with a first virtual machine (VM) instance for which the ingress packet it destined; identify, based at least in part on the entry, at least one of a first virtual extensible local area network (VxLAN) network identifier (VNI) or a first VxLAN tunnel endpoint (VTEP) address; encapsulate, as a first encapsulated packet, the first ingress packet, based at least in part on at least one of the first VNI or the first VTEP address; and forward the first encapsulated packet to at least one of a first virtual private cloud (VPC) router or the first VM instance.

P. The non-transitory computer-readable medium of paragraph O, wherein the instructions further cause the ASIC to: determine that a second VLAN tag and a second destination second ingress packet do not match any entries in the connection table; identify, from the second ingress packet, a subnet identifier; encapsulate, as a second encapsulated packet and based at least in part on at least one of a global VNI or a gateway address associated with the subnet identifier, the second ingress packet; and forward the second encapsulated packet to a network gateway.

Q. The non-transitory computer-readable medium of either paragraph O or P, wherein the instructions further cause the ASIC to: determine that a VNI associated with a first egress packet matches a second entry in the connection table; and forward the egress packet to customer equipment, based at least in part on at least one of a third VLAN tag or a next hop identifier associated with the second entry.

R. The non-transitory computer-readable medium of any one of paragraphs O-Q, wherein the instructions further cause the ASIC to: determine that a VNI associated with a second egress packet does not matches any entries in the connection table; and at least one of forward the second egress packet to a network gateway or discard the second egress packet.

S. The non-transitory computer-readable medium of any one of paragraphs O-R, wherein the connection table comprises: a first entry corresponding to a first active connection between first customer equipment and a first VPC; and a second entry corresponding to a second active connection between second customer equipment and a second VPC.

T. The non-transitory computer-readable medium of any one of paragraphs O-S, wherein the non-transitory computer-readable medium comprises a cache associated with the switch.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously, in reverse order, with additional operations, or omitting operations, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A switch comprising:
    a port that is configured to send and receive network traffic comprising packets;
    an application-specific integrated circuit (ASIC);
    a memory storing a set of instructions that, when executed, cause the ASIC to:
        receive a packet via the port;
        determine to forward the packet via a first path instead of a second path, wherein the first path comprises forwarding the packet to at least one of a virtual private cloud (VPC) or a virtual machine (VM) host, and wherein the second path comprises forwarding the packet to a gateway; and
        forward the packet via the first path;
    wherein the memory further stores a connection table and wherein determining to forward the packet via the first path comprises:
        determining that the packet includes a virtual local area network (VLAN) tag and a destination IP address that match an entry in the connection table;
        identifying, from the connection table and based at least in part on at least one of the VLAN tag or the destination IP address, a virtual extensible local area network (VxLAN) network identifier (VNI) associated with the VPC to which the packet is destined; and
        identifying, from the connection table and based at least in part on the destination IP address, a VxLAN tunnel endpoint (VTEP) address associated with the VM host to which the packet is destined.

2. The switch of claim 1, wherein forwarding the packet via the first path comprises bypassing the gateway.

3. The switch of claim 1, wherein determining to forward the packet via the first path is based at least in part on a connection table and wherein the memory further stores the connection table, the connection table comprising:

a first entry corresponding to a first active connection between a first customer equipment and a first VPC; and a second entry corresponding to a second active connection between a second customer equipment and a second VPC.

4. The switch of claim 1, wherein forwarding the packet via the first path comprises encapsulating the packet in a VxLAN frame and forwarding it to at least one of a VPC router or the VM host.

5. The switch of claim 1, wherein:
the switch is deployed as part of an edge of a network architecture, and
upstream network traffic received at the port comprises an Internet layer protocol.

6. The switch of claim 1, wherein the instructions further cause the ASIC to:
receive, at the port and from the VPC, an egress packet;
identify, based at least in part on a virtual extensible local area network (VxLAN) network identifier (VNI) associated with the egress packet and a connection table stored in the memory, at least one of a virtual local area network (VLAN) tag or a next hop identifier;
forward, based at least in part on the VLAN tag and towards customer equipment, the egress packet.

7. A non-transitory computer-readable medium having a connection table and a set of instructions that, when executed, cause an application-specific circuit (ASIC) associated with a network switch to:
determine that a first virtual local area network (VLAN) tag and a destination address match at least part of an entry of the connection table, wherein a first ingress packet includes the first VLAN tag and wherein the first destination address is associated with a first virtual machine (VM) instance for which the ingress packet is destined;
identify, based at least in part on the entry, at least one of a first virtual extensible local area network (VxLAN) network identifier (VNI) or a first VxLAN tunnel endpoint (VTEP) address;
encapsulate, as a first encapsulated packet, the first ingress packet, based at least in part on at least one of the first VNI or the first VTEP address;

forward the first encapsulated packet to at least one of a first virtual private cloud (VPC) router or the first VM instance;
determine that a second VLAN tag and a second destination second ingress packet do not match any entries in the connection table;
identify, from the second ingress packet, a subnet identifier;
encapsulate, as a second encapsulated packet and based at least in part on at least one of a global VNI or a gateway address associated with the subnet identifier, the second ingress packet; and
forward the second encapsulated packet to a network gateway.

8. The non-transitory computer-readable medium of claim 7, wherein the instructions further cause the ASIC to:
determine that a VNI associated with a first egress packet matches a second entry in the connection table; and
forward the egress packet to customer equipment, based at least in part on at least one of a third VLAN tag or a next hop identifier associated with the second entry.

9. The non-transitory computer-readable medium of claim 7, wherein the instructions further cause the ASIC to:
determine that a VNI associated with a second egress packet does not match any entries in the connection table; and
at least one of forward the second egress packet to a network gateway or discard the second egress packet.

10. The non-transitory computer-readable medium of claim 7, wherein the connection table comprises:
a first entry corresponding to a first active connection between a first customer equipment and a first VPC; and
a second entry corresponding to a second active connection between a second customer equipment and a second VPC.

11. The non-transitory computer-readable medium of claim 7, wherein the non-transitory computer-readable medium comprises a cache associated with the switch.

* * * * *